United States Patent
Chuang

(10) Patent No.: US 9,203,094 B2
(45) Date of Patent: Dec. 1, 2015

(54) CATALYSTS COMPOSITIONS FOR USE IN FUEL CELLS

(75) Inventor: Steven S. C. Chuang, Hudson, OH (US)

(73) Assignee: The University of Akron, Akron, OH (US)

( * ) Notice: Subject to any disclaimer, the term of this patent is extended or adjusted under 35 U.S.C. 154(b) by 1703 days.

(21) Appl. No.: 12/441,161

(22) PCT Filed: Sep. 13, 2007

(86) PCT No.: PCT/US2007/019853
§ 371 (c)(1),
(2), (4) Date: Aug. 11, 2009

(87) PCT Pub. No.: WO2008/033421
PCT Pub. Date: Mar. 20, 2008

(65) Prior Publication Data
US 2009/0305090 A1 Dec. 10, 2009

Related U.S. Application Data

(60) Provisional application No. 60/844,228, filed on Sep. 13, 2006.

(51) Int. Cl.
| | | |
|---|---|---|
| *H01M 4/90* | (2006.01) | |
| *H01M 4/86* | (2006.01) | |
| *H01M 4/92* | (2006.01) | |
| *H01M 8/12* | (2006.01) | |
| *H01M 8/14* | (2006.01) | |
| *H01M 8/22* | (2006.01) | |

(52) U.S. Cl.
CPC ............ *H01M 4/9058* (2013.01); *H01M 4/905* (2013.01); *H01M 4/9025* (2013.01); *H01M 4/9033* (2013.01); *H01M 8/1233* (2013.01); *H01M 8/143* (2013.01); *H01M 8/22* (2013.01); *H01M 4/90* (2013.01); *H01M 4/92* (2013.01); *H01M 8/1253* (2013.01); *H01M 2008/147* (2013.01); *Y02E 60/521* (2013.01); *Y02E 60/525* (2013.01); *Y02E 60/526* (2013.01)

(58) Field of Classification Search
None
See application file for complete search history.

(56) References Cited

U.S. PATENT DOCUMENTS

| | | | |
|---|---|---|---|
| 7,261,833 B2 | 8/2007 | Seabaugh et al. | |
| 2004/0093222 A1 | 5/2004 | Sipe et al. | |
| 2004/0202924 A1* | 10/2004 | Tao et al. | 429/102 |
| 2006/0028502 A1 | 2/2006 | Lee et al. | |
| 2006/0134347 A1 | 6/2006 | Chiruvolu et al. | |

(Continued)

FOREIGN PATENT DOCUMENTS

| | | | | |
|---|---|---|---|---|
| WO | WO 2007/062117 | * | 5/2007 | ............ H01M 10/44 |

OTHER PUBLICATIONS

Gannon et al, High-Temperature Oxidation Resistance and Surface Electrical Conductivity of Stainless Steels with Filtered Arc Cr-Al-N Multilayer and/or Superlattice Coatings, 55-61 Surface & Coatings Tech. 188-189 (2004).*

(Continued)

*Primary Examiner* — Yoshitoshi Takeuchi
(74) *Attorney, Agent, or Firm* — Renner Kenner Greive Bobak Taylor & Weber

(57) ABSTRACT

The present invention generally relates to the generation of electrical energy from a solid-state fuel. In one embodiment, the present invention relates to a solid-oxide fuel cell for generating electrical energy from a carbon-based fuel, and to catalysts for use in a solid-oxide fuel cell.

12 Claims, 27 Drawing Sheets

(56) References Cited

U.S. PATENT DOCUMENTS

2007/0017368 A1* 1/2007 Levan et al. .................. 95/96
2007/0065701 A1 3/2007 Cable et al.

OTHER PUBLICATIONS

A. Hamnett and P. Christensen, "Electrochemical and Photoelectrochemical Energy Conversion," N. Hall, (15), 407-439, Cambridge, 2000.

Richard E. Mistler and Eric R. Twiname, "Tape Casting—Theory and Practice," the American Ceramic Society, Westervile, OH, 2000.
Toebes, Marjolein L., et al, "Impact of the Structure and Reactivity of Nickel Particles on the Catalytic Growth of Carbon Nanofibers", Catalysis Today 76 (2002) 33-42.
Lu, C., et al., "SOFCs for Direct Oxidation of Hydrocarbon Fuels with Samaria-doped Ceria Electrolyte," Journal of the Electrochemical Society (2003), 150(3), A354-A358.

* cited by examiner

C+CH$_4$+Ar : Coke/75%CH$_4$/25%Ar
C+CH$_4$+C$_7$H$_{16}$+Ar : Coke/70.35%CH$_4$/4.65%C$_7$H$_{16}$/25%Ar
C+H$_2$+H$_2$S+Ar : Coke/74.925%H$_2$/0.075%H$_2$S/25%Ar
C+Ar : Coke/100%Ar
C+H$_2$+H$_2$S+C$_7$H$_{16}$ : Coke/70.28%H$_2$/0.0703%H$_2$S/4.65%C$_7$H$_{16}$/25%Ar Anode : Modified-Ni(5%)/YSZF(75%)YSZP(25%)
Electrolyte : YSZ (0.5 mm)
Cathode : LSMO/YSZ

US 9,203,094 B2

CATALYSTS COMPOSITIONS FOR USE IN FUEL CELLS

RELATED APPLICATION DATA

This application claims priority to previously filed U.S. Provisional Patent Application No. 60/844,228, filed on Sep. 13, 2006, and PCT/US2007/019853, filed Sep. 13, 2007, entitled "Catalysts Compositions for Use in Fuel Cells", which is incorporated by reference herein in its entirety.

STATEMENT REGARDING FEDERALLY SPONSORED RESEARCH OR DEVELOPMENT

This invention was made with government support under FG36-06G086055 awarded by the Department of Energy. The government has certain rights in the invention.

FIELD OF THE INVENTION

The present invention generally relates to the generation of electrical energy from a solid-state fuel. In one embodiment, the present invention relates to a solid-oxide fuel cell for generating electrical energy from a carbon-based fuel, and to catalysts for use in a solid-oxide fuel cell.

BACKGROUND OF THE INVENTION

The direct use of carbon in a fuel cell to generate electricity is an attractive approach for power generation. A number of carbonate and alkali fuel cells have been used for the direct generation of electricity from treated coal (i.e., ultra low sulfur/ash coal).

Conventional solid-oxide fuel cells utilize an electrolyte located between an anode and cathode facilitating the transfer of ions there between. Traditionally solid-state fossil fuels, such as coal, had to be gasified and reformed prior to being introduced to a solid-oxide fuel cell to generate electric energy. Although additional processing steps are required, the use of such solid-state fossil fuels to generate electricity remains an attractive option due in part to the high energy density of such fuels. The separate gasification and reforming steps requiring a substantial influx of thermal energy, and with heat recovery being low, an inefficient process results.

The basic principles of carbon-based fuel cells are well known in the art. Carbon (i.e., C) fuel is supplied to the anode side of a fuel cell while air is provided to the cathode side. Oxygen from the air adsorbs on the cathode catalyst. Depending on the type of electrolyte used, oxygen is converted to $O^{2-}$, $OH^-$ or $CO_3^{2-}$ with $H_2O$ or $CO_2$, according to the corresponding the cathode reaction category, discussed later in Table 1. In an alkali fuel cell, $O^{2-}$ reacts with $H_2O$ to form $OH^-$ on the cathode catalyst. $OH^-$ diffuses across liquid alkali membrane to the anode in order to react with carbon to produce $CO_2$ and electrons. In a carbonate fuel cell, $O^{2-}$ reacts with $CO_2$ to form carbonate on the cathode catalyst. Carbonate serving as electrolyte can further react with carbon to produce $CO_2$ and electrons on the anode catalyst. These fuel cells operate at 400 to 650° C. The major shortcoming of these fuel cells being their short life span when using coal as the fuel. This is resulted from the build up of flyash and a poisoning of electrodes by sulfur compounds in coals. The long period of operation for these fuel cells can only be achieved by using high purity carbon as the fuel.

The use of high temperature solid oxide electrolytes and perovskite catalysts allows for conversion of oxygen to $O^{2-}$ which diffuses across the electrolyte membrane to the anode for oxidation. Methods employing other solid oxide membranes use liquid anodes to carry out the oxidation of carbon to carbon dioxide and are known in the art. One issue with the liquid anode approach is that such an approach faces the challenge of rapid deactivation. A recent approach utilized a solid oxide membrane and proposed the use of fluidized bed mode of a solid oxide fuel cell technology for the direct electrochemical oxidation of coal. This proposed technology involves use of an Hg lead, of which the environmental impact is unclear.

The disclosure of WO2006/028502 details the use of Pt, Cu, Re and Ni as suitable anode catalysts for the electrochemical oxidation of solid carbon-containing fuels. There is currently a need in the art for anode catalysts being active for the electrochemical oxidation of carbon containing fuel such as coal and biomass to produce electricity and $CO_2$ in a solid oxide fuel cell. These carbon containing fuels including but not limited to coal, coke, pretreated de-ash coal, petroleum coke, plastics, rubber, and biomass.

SUMMARY OF INVENTION

The present invention generally relates to the generation of electrical energy from an organic fuel. In one embodiment, the present invention relates to a solid-oxide fuel cell for generating electrical energy from an organic based fuel, and to catalysts for use in a solid-oxide fuel cell.

In one embodiment the present invention relates to a direct electrochemical oxidation fuel cell system for generating energy from an organic fuel comprising: a cathode provided with an electrochemical-reduction catalyst that promotes formation of oxygen ions from an oxygen-containing source at the cathode, an anode provided with an electrochemical-oxidation catalyst that promotes direct electrochemical oxidation of the organic fuel in the presence of the oxygen ions to produce electrical energy, the anode catalyst being Ce oxide, Ce—Zr oxide, Ce—Y oxide, Cu, Ag, Au, Ni, Mn, Mo, Cr, V, Fe, Co, Ru, Rh, Pd, Pt, Ir, Os, a perovskite or any combination thereof, a solid-oxide electrolyte disposed to transmit the oxygen ions from the cathode to the anode with the electrolyte in continuous contact with the anode and cathode and with direct electrochemical oxidation occurring at the anode, a means of feeding the organic fuel, a means for removing waste, a means for securing the anode, electrolyte and cathode, and a means for drawing off electricity.

In still another embodiment the present invention relates to a method of generating electrical power from an organic fuel comprising the steps of: providing a fuel cell system having an anode, a cathode and an electrolyte, feeding the organic fuel to the fuel cell system, removing waste from the fuel cell system, forming oxygen ions from an oxygen-containing source at the cathode, transmitting the oxygen ions formed at the cathode to the anode with anode catalysts of Ce oxide, Ce—Zr oxide, Ce—Y oxide, Cu, Ag, Au, Ni, Mn, Mo, Cr, V, Fe, Co, Ru, Rh, Pd, Pt, Ir, Os, a perovskite and/or any combination thereof, and catalyzing a reaction of the oxygen ions with the organic fuel to directly oxidize the solid state organic fuel at the anode to produce a product and electrical energy.

BRIEF DESCRIPTION OF THE FIGURES

FIG. 10(b) provides a view of a single fuel cell with the solid injection port and exit port; FIG. 10(c) provides a fuel cell stack for solid fuels;

DETAILED DESCRIPTION OF THE INVENTION

Figure 1:
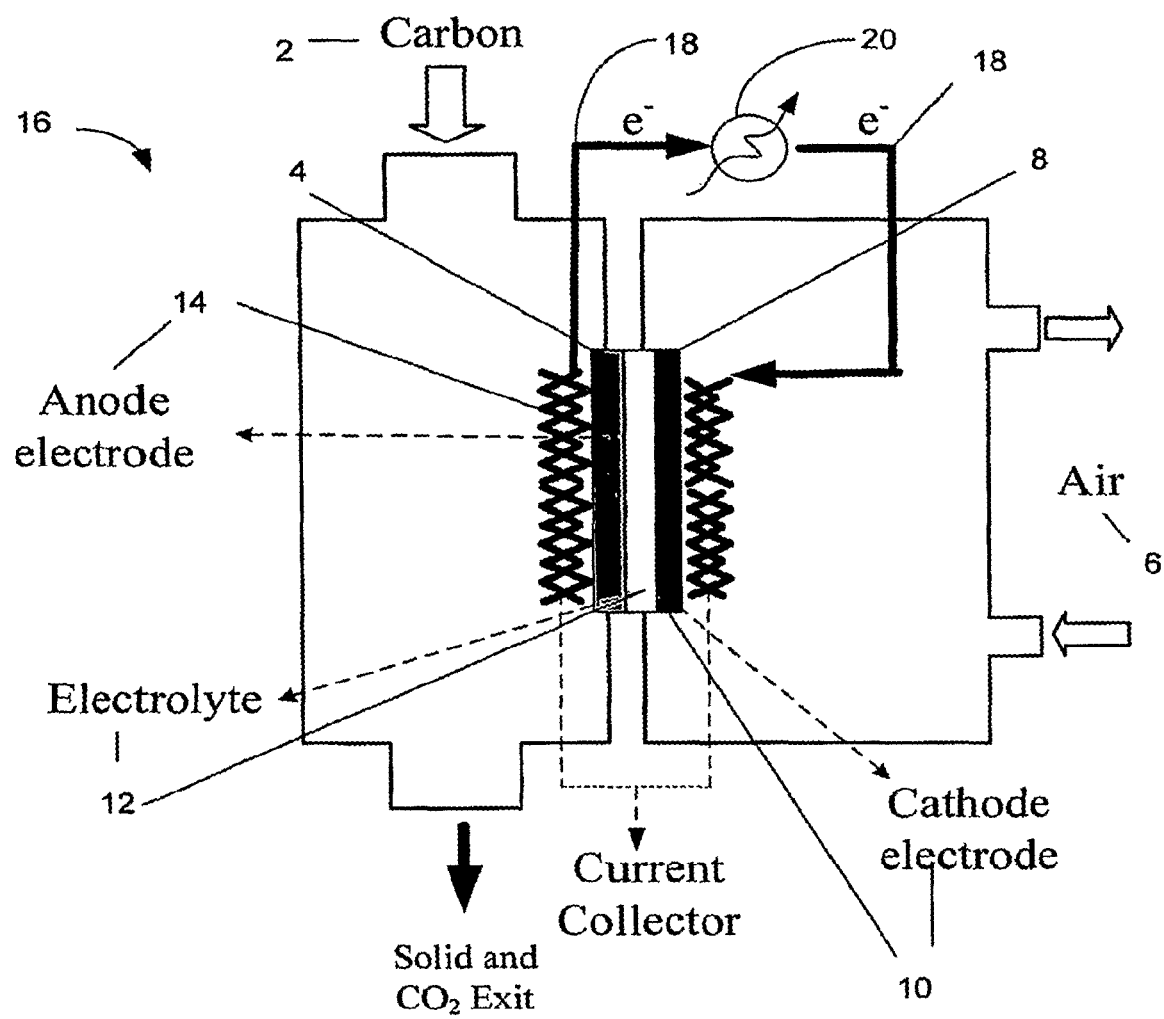
FIG. 1 is a drawing detailing a carbon based fuel cell.

The basic principle of carbon-based fuel cell systems 16 are illustrated in FIG. 1. A fuel cell system includes the fuel cell and accompanying apparatus to allow said fuel cell to operate. Carbon (i.e., C) fuel 2 is supplied to the anode side 4 while air 6 is provided to the cathode side 8, allowing oxygen from air 6 to absorb on the cathode catalyst 10. Depending on the type of electrolyte 12 used, oxygen is converted to $O^{2-}$, $OH^-$ or $CO_3^{2-}$ with $H_2O$ or $CO_2$, as shown in the cathode reaction category in Table 1. In an alkali fuel cell, $O^{2-}$ reacts with $H_2O$ to form $OH^-$ on the cathode catalyst 10. $OH^-$ diffuses across liquid alkali membrane to the anode 14 in order to react with carbon to produce $CO_2$ and electrons. In a carbonate fuel cell, $O^{2-}$ can react with $CO_2$ to form carbonate on the cathode catalyst 10. Carbonate serving as electrolyte 12 can further react with carbon to produce $CO_2$ and electrons on the anode catalyst. While this temperature may vary, these fuel cell systems 16 in one embodiment operate at from 400 to 1200° C. or even from about 400 to 650° C., or even from about 450 to 900° C. The major shortcoming of these fuel cells being their short life span. This results from the build up of flyash and the poisoning of electrodes by sulfur compounds in coals. The long period of operation for these fuel cells can only be achieved by using high purity carbon as the fuel.

Figure 2:
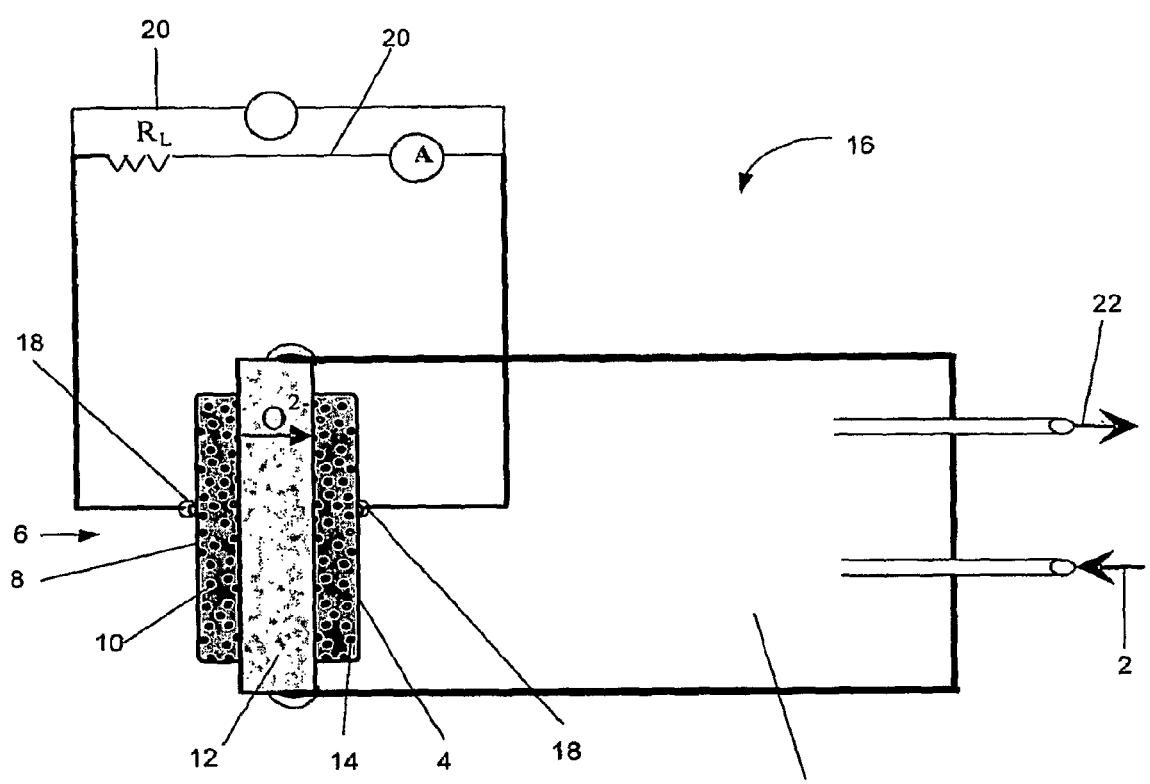
FIG. 2 details another embodiment of a carbon based solid oxide fuel cell which provides detail of the fuel containment.

FIG. 2 provides another illustration of the setup with emphasis showing containment of the fuel 2 inside the organic fuel cell system 16. Also shown is a takeaway stream for effluent 22.

Other organic fuels which may be utilized in some embodiments include any carbon-series fuel or any solid material having at least one carbon atom, including fossil fuels such as coal, graphite, charcoal, biomass, polymers such as polyethylene and/or any number of rubber based products, and other hydrocarbons that are solids at atmospheric pressure and room temperature. Examples of biomass include peat, rice hulls, corn husks, and the like. Although the organic fuel is usually in the solid state, the fuel can be ground, chopped, or otherwise broken down into small particulate solids to form a fine-powder organic fuel. Breaking the solid-state organic fuel down to fine particles makes the solid-state organic fuel more readily oxidized in the presence of the oxygen ions on the anode surface. Alternate embodiments of the present invention operate with solid-fuel particle sizes small enough to resemble a pulverized coal particle. Such embodiments can also entrain the fine particles of solid-state organic fuel in a non-reactive, or inert gas to facilitate the transport of the fuel particles to the anode 14, Another alternate embodiment of the present invention utilizes liquid fuels such as gasoline, kerosene, diesel and liquefied natural gas or may utilize gases such as natural gas or propane.

As is known in the art, the cathode 10 includes an electrochemical-reduction catalyst that promotes formation of oxygen ions, preferably oxygen anions, from an oxygen-containing source according to the electrochemical-reduction reaction:

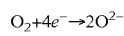

The oxygen-containing source can be any fluid, such as air, that includes oxygen that can be reduced to $O^{2-}$ in the presence of the cathode catalyst. The present invention in one embodiment uses air 6 as the oxygen containing source.

Ionic electrically-conductive materials conduct electric current due to the flow of ions, while electronic electrically-conductive materials conduct electric current due to the flow of electrons. A mixed ionic-and-electronic, electrically-conductive material can conduct electric current due to the flow of either ions or electrons, or both.

The cathode 10 can be made from a mixed ionic-and-electronic electrically-conductive material, and comprises an electrochemical-reduction catalyst, interchangeably referred to herein as the cathode catalyst, that catalyzes the electrochemical-reduction reaction that takes place at the cathode 10. The cathode 10 can be a mixed ionic-and-electronic conducting oxide which is a composite of ionic-conducting electrolyte and cathode catalyst. As is known in the art cathode catalysts can be, but is not limited to, Lanthanum Strontium Manganese Oxide, having the symbol $La_{0.95}Sr_{0.05}MnO_3$, ("LSM"), Lanthanum Strontium Ferrite, having the symbol $La_{0.8}Sr_{0.2}FeO_3$) ("LSF"), Lanthanum Strontium Cobalt Ferrite, having the symbol $La_{0.6}Sr_{0.4}Fe_{0.8}Cu_{0.2}O_3$, ("LSCF"), and Samaria Strontium Cobalt Oxide, having the symbol $Sm_{0.5}Sr_{0.5}CoO_3$, ("SSC"), for example. Other perovskites suitable to be provided to the cathode catalyst include $YBa_2Cu_3O_y$, wherein y is an integer having values within a range of 7-9; $La_{0.99}MnO_3$; $LaMnO_3$; $La_xSr_yMn_3$ and $La_x$-$Ca_yMnO_3$, wherein x is a number having values within a range of 0.6-0.95, and y is a number having values within a range of 0.1-0.4; and any other material having a general formula of $A_xB_yCO_3$, wherein A is selected from the group consisting of La, Gd, Sm, Nd, Pr, Tb and Sr, B is selected from the group consisting of Sr, Ce, and Co, x is a number having values within a range of 0.6-0.95, and y is a number having values within a range of 0.1-0.4. Materials other than mixed conducting oxides such as Ag are also suitable for forming cathode catalysts. In another embodiment, suitable cathodes include, but are not limited to, $La_{1-x}Sr_xMnO_{3-\delta}$, $La_{1-x}Ca_xMnO_3$, $La_{1-x}Sr_xFeO_3$, $La_{1-x}Sr_xCoO_3$, $La_{1-x}Sr_xCo_{1-y}Ni_yO_{3-\delta}$, $La_{1-x}Sr_xCo_{1-y}Fe_yO_{3-\delta}$, $La_{1-x}Sr_xNi_{1-y}Fe_yO_{3-\delta}$, $SrFe_xCo_yO_{3-\delta}Sm_{0.5}Sr_{0.5}CoO_3$, $La_2NiO_4$ or $YBa_2Cu_3O_{3-\delta}$ with X and Y being between 0.0 and 1.0 and $\delta$ being less than 1.0.

Similar to the cathode 10, the anode 14 can be made from a mixed ionic-and-electronic, electrically-conductive material which is a composite of ionic conducting electrolyte and anode catalyst. However, instead of being an electrochemical-reduction catalyst, the anode 14 comprises an electrochemical-oxidation catalyst that promotes direct electrochemical oxidation of the solid-state organic fuel in the presence of the oxygen ions (anions) generated at the cathode 10 to produce electrical energy. The electrochemical-oxidation catalyst, also interchangeably referred to herein as the anode catalyst, optionally includes a sulfur-resistant substance that prevents the stable formation of a metal sulfide, thus minimizing the effects of sulfur poisoning on the anode catalyst. The anode catalyst can be a noble metal, group VIII metal/metal oxide, such as Pt, Cu, Ag, Au, Pd, Ni, and it can be other metals, however the non-noble metals also include a sulfur-resistant substance such as Re, Mn, Mo, V, Ag, Cu and Au, oxides of the aforementioned metals as well as oxides of Ce, Cr, Fe, and Pb, various solid electrolytes, and combinations thereof, multiple oxides, and combinations including one or more of the aforementioned metals, such as Cu oxide-Pt, and Re—NiO/YSZ, (where YSZ represents Yttrium-Stabilized Zirconia). Embodiments of the anode 14 include compositions that are substantially devoid of vanadium carbide. Vanadium carbide is a heavy metal that is considered to be an environmental pollutant, and thus, it is desirable to eliminate its use in fuel cells. Nonlimiting examples of other suitable anode catalysts include perovskites such as $Sr_{0.6}La_{0.4}TiO_3$, for example. The anode catalysts are highly-active oxidizing catalysts that promote the direct and substantially-complete electrochemical oxidation of the solid-state organic fuel at the anode 14 within the operating temperature of the fuel cell, without requiring gasification of the solid-state organic fuel before performing the electrochemical oxidation thereof. Maintaining the operating temperature of the fuel cell of the present invention at any temperature within a range of about 460° C. to about 1200° C. allows direct electrochemical oxidation of the solid-state organic fuel proceeds according to the main reaction:

$$C + 2O^{2-} \rightarrow CO_2 + 4e^-$$

another possible reaction:

$$M_x + yO^{2-} \rightarrow M_xO_y + 2ye^-$$

where M may be other species such as sulfur, hydrogen, Fe, Si, Al and contaminants in solid state organic fuel such as coal.

In another embodiment the anode used is a copper plated nickel, or in even another embodiment the anode utilized is a silver plated or gold plated nickel. The process utilized for this plating can be, but is not limited to electroless plating.

In addition to the materials discussed above, both the cathode and the anode each further comprise material that forms the solid-oxide electrolyte 18 for facilitating transportation of the oxygen ions, preferably oxygen anions, from the cathode to the anode.

A solid-oxide electrolyte 12 is disposed to transport the oxygen ions (anions) from the cathode 10 to the anode 14. The solid-oxide electrolyte 12 is the medium which provides the oxygen anion $O^{2-}$ ion-transport mechanism between the cathode 10 and anode 14. Current flow via a solid-oxide electrolyte 12 is due to the movement of ions instead of the movement of electrons as in conventional current flow. As shown in FIG. 2, the solid-oxide electrolyte 12 is located between the cathode 10 and anode 14, which are coupled to opposite surfaces of the solid-oxide electrolyte 12. The electrolyte 12 is in continuous contact with both the cathode 10 and anode 14 and is capable of transmitting $O_2$ anions. As is known in the art, suitable solid-oxide electrolytes 12 can be formed from doped oxides of Bi, Zr, Hf, Th, and Ce with either alkaline earth oxides such as CaO or MgO, or rare-earth oxides such as $Sc_2O_3$, $Y_2O_3$, $Yb_2O_3$, and the like. Examples include, but are not limited to, a solid-oxide electrolyte 12 comprising at least one of $(ZrO_2)_{0.92}(Y_2O_3)_{0.08}$, $(Bi_2O_7)_{0.75}(Y_2O_3)_{0.25}$, $(La_2O_3)_{0.95}(SrO)_{0.05}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}(Sc_2O_3)_{0.1}$, $(ZrO_2)_{0.9}(Y_2O_3)_{0.1}$, or $(ZrO_2)_{0.87}(CaO)_{0.13}$ and the like. In another embodiment the electrolyte can be yttrium-stabilized zirconia or scandium-stabilized zirconia.

Application of the cathode 10 and anode 14 along with their respective catalysts to the electrolyte 12 can be accomplished by forming the cathode and anode 10, 14 from a paste that comprises the respective catalyst. Each paste is applied as a film onto suitable surfaces of the solid-oxide electrolyte 12 to facilitate the transfer of oxygen ions (anions) from the cathode 10 to the anode 14. Any conventional coating technique can be employed to apply the electrode pastes to the solid-oxide electrolyte 12 surfaces. The thickness of each of the cathode and anode 10, 14 applied to the solid-oxide electrolyte 12 should be balanced along with the thickness of the solid-oxide electrolyte 12 to ensure that forces exerted on each material from the expansion experienced by each within the operating temperature range of the fuel cell 16 does not cause fractures in adjacent materials. Obtaining the suitable thickness of each material can be accomplished by sound engineering judgment by one of ordinary skill in the art. The term "thickness" as used above, refers to the dimensions of each material in a direction perpendicular to a primary planar surface that can form an interface between the cathode and anode 10, 14 and the solid-oxide electrolyte 12.

The requirements for efficient fuel cell operation in the present invention include an electrolyte with high oxygen anion conductivity, high mechanical strength and decent thermal stability. The anode and cathode require proper catalytic activity and electron/ion conductivity and stability under reaction condition. The anode and cathode must also be structurally and mechanically compatible with the electrolyte at operating temperatures and fuel fabrication temperatures. Finally, the anode and cathode must possess the ability to distribute oxygen anions and electrons over the entire electrode surface.

Conventional electrical conductors in the form of wires and connectors 18 extend from each of the cathode and anode 12, 14 to conduct electric energy generated by the fuel cell, thereby forming an electric circuit 20. Examples of suitable electric-conducting materials include Pt for temperatures less than about 1000° C., Cu for temperatures less than about 600° C., Ni for temperatures less than about 700° C., (with Cu and Ni typically working in a reducing environment) Ag for temperatures less than about 800° C., stainless steel for temperatures less than about 750° C., any alloys, and electronic conducting oxides. Au, Ag, Pt and Pd based wires being used in various embodiments at solid oxide fuel cell operating temperatures in an oxidizing environment.

The use of high temperature solid oxide electrolytes and perovskite catalysts converts oxygen to $O^{2-}$ which diffuses across the electrolyte membrane to the anode for oxidation. Methods employing other solid oxide membranes utilize liquid anodes to carry out the oxidation of carbon to carbon dioxide. One issue with the liquid anode approach is that such an approach faces potential rapid deactivation. Another approach utilized a solid oxide membrane and proposed the use of fluidized bed mode of a solid oxide fuel cell technology for the direct electrochemical oxidation of coal. This technology involves use of an Hg lead, of which the environmental impact is unclear.

Table 1 provides a chemical breakdown for the various fuel cell types and the reaction occurring at the anode and cathode.

oxide, Cu, Ag, Au, Ni, Mn, Mo, Cr, V, Fe, Co, Ru, Rh, Pd, Pt, Ir, Os, a perovskite, solid electrolytes, and/or any combination thereof. The catalysts of the present invention are active for electrochemical oxidation of solid-carbon-containing coal to produce electricity and $CO_2$ in the solid oxide fuel cell. The solid carbon-containing fuels for use in conjunction with the present invention include, but are not limited to, coal, coke, pre-treated de-ashed coal, petroleum coke, plastics, rubber, and biomass.

In one embodiment, the present invention involves the integration of one or more carbon oxidation catalysts into the anode structure of a solid oxide fuel cell. In one embodiment, the carbon oxidation catalysts according to the present invention include, but are not limited to, Ce oxide, Ce—Zr oxide. Ce—Y oxide, Cu, Ag, and perovskites ($La_{1-x}Sr_x)_{0.9}Cr_{0.5}Mn_{0.5}O_{3-\delta}$, $Sr_2Mg_{1-x}Mn_xMoO_{6-\delta}$, $La_{0.2}A_{0.8}Cu_{0.2}Fe_{0.8}O_{3-\delta}$ where A is selected from Sr, Ba, Ca. In another embodiment, other forms of perovskite such as BSCF can be used in conjunction with the present invention. In another embodiment the perovskite can be, but is not limited to, $LaCO_3$, $(La_{1-x}Sr_x)_{0.9}Cr_{0.5}Mn_{0.5}O_{3-\delta}$, $Sr_2Mg_{1-x}Mn_xMoO_{6-\delta}$, $Ba_{1-x}Sr_xCo_{1-y}Fe_yO_{3-\delta}$, or $La_{1-x}A_xCo_{1-y}Fe_yO_{3-\delta}$ with A being Sr, Ba, or Ca, X and Y being a value between 0.0 and 1.0, and $\delta$ being a value less than 1.0.

Figure 3:
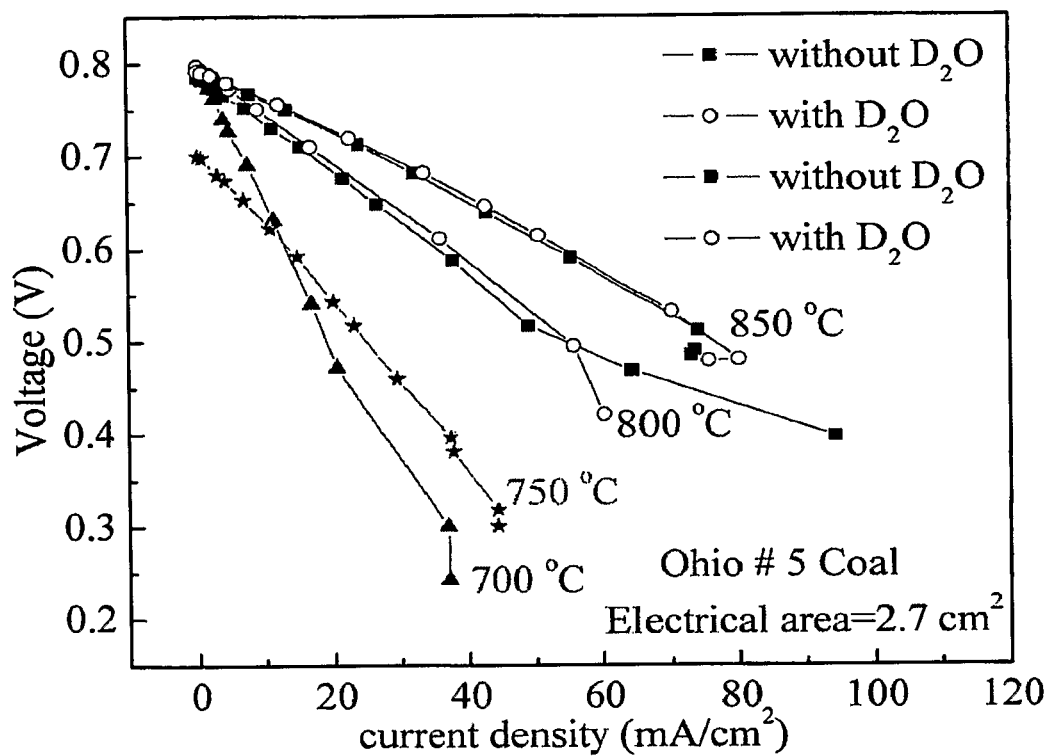
FIG. 3 is a graph comparing voltage versus current density for a modified metal-based anode/YSZ disk/LSM-YSZ cathode from a commercial fuel cell at three different temperatures and with and without $D_2O$.

The V-I (voltage-current density) curves of the $CuO_x$/$CeO_2$/Ni/YSZ (8 wt Yttria-Stabilized Zirconia)/LSM (thickness: 100 μm, diameter: 3 cm) fuel cell using Ohio #5 coal as the fuel is shown in FIG. 3 illustrate that the increase in current density (mA/cm$^2$) with a decrease in voltage is a result of polarization (i.e., the loss in electrical potential) from the electrodes and the electrolyte resistance. The properties of Ohio #5 Coal are detailed in Table 2. The polarization due to the electrodes can be decreased by increasing the anode catalyst activity and three phase boundary; the electrolyte resistance can be reduced by decreasing the thickness of electrolyte and the use of a highly $O^{2-}$ conductive electrolyte. The addition of $D_2O$ (a D labeled water molecule) resulted in little variation in the V-I curves, suggesting that coal gasification to CO and $D_2$ (i.e., $H_2$) did not occur to a significant extent, contributing to the electricity generation.

TABLE 2

| PROXIMATE ANALYSIS | |
|---|---|
| % Moisture as received | 4.15 |
| Dry % ash | 4.80 |
| Dry % volatile matter | 37.98 |

TABLE 1

| Fuel Cell Type | Anode Reaction | Cathode Reaction |
|---|---|---|
| Alkali | $C + 6\,OH^- \rightarrow CO_3^{2-} + 3\,H_2O + 4e^-$ | $O_2 + 2\,H_2O + 4e^- \rightarrow 4\,OH^-$ |
| | $C + 2\,CO_3^{2-} \rightarrow 3\,CO_2 + 4e^-$ | |
| Molten Carbonate | $C + 2\,CO_3^{2-} \rightarrow 3\,CO_2 + 4e^-$ | $O_2 + 2\,CO_2 + 4e^- \rightarrow 2\,CO_3^{2-}$ |
| Solid oxide membrane | $2O^{2-} + Sn_l \rightarrow SnO_2$ | $O_2 + 4e^- \rightarrow 2\,O^{2-}$ |
| | $2\,SnO_2 + C \rightarrow 2\,Sn + CO_2$ | |
| Solid oxide membrane | Liquid anode | $O_2 + 4e^- \rightarrow 2\,O^{2-}$ |
| Solid oxide membrane | Direct contact of coal to anode | $O_2 + 4e^- \rightarrow 2\,O^{2-}$ |

The present invention generally relates to the generation of electrical energy from a solid-state fuel. In one embodiment, the present invention relates to a solid-oxide fuel cell for generating electrical energy from a carbon-based fuel, and to catalysts for use in a solid-oxide fuel cell.

In one embodiment, the present invention relates to anode catalysts that comprise Ce oxide, Ce—Zr oxide, Ce—Y TABLE 2-continued

| Dry % fixed carbon | 57.22 |
|---|---|
| SULFUR FORMS | |
| % Pyritic | 0.70 |
| % Sulfate | 0.01 |

TABLE 2-continued

| | |
|---|---|
| % Organic | 1.21 |
| % Total | 1.92 |
| ULTIMATE ANALYSIS | |
| % Carbon | 83.99 |
| % Hydrogen | 5.50 |
| % Nitrogen | 1.88 |
| % Oxygen | 8.63 |
| CALORIC VALUE (BTU/lb) | 14258 |
| EQUILIBRIUM MOISTURE (%) | 7.98 |

Figure 4:
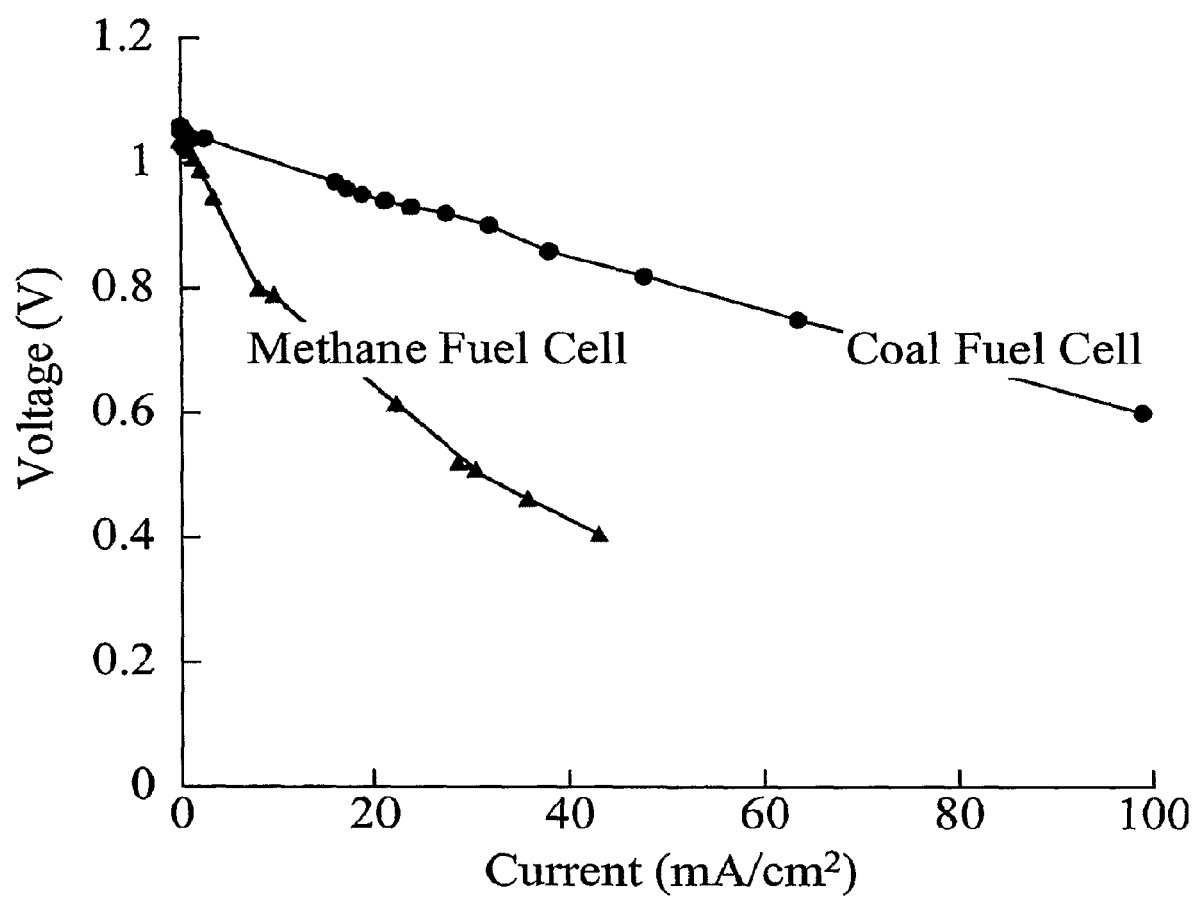
FIG. 4 is a plot of experimentally-determined values for voltage versus current density for a Cu-anode fuel cell operating with methane as the fuel and a fuel cell operating with coal as the fuel.

FIG. 4 offers a comparison of voltage versus current density curve of the fuel cell operating at a temperature of 900° C. and using Ohio No. 5 coal (having the composition shown in Table 2) versus that of a fuel cell using methane as a fuel and copper as an anode catalyst under comparable operating conditions. FIG. 4 illustrates that the fuel cell utilizing solid-state organic fuel produced a higher current density than that produced by the fuel cell using methane for a given voltage. Again, without being bound by theory, this unexpected result is due at least in part to the near absence of dilution of coal (the solid-state organic fuel) at the electrochemical-oxidation catalyst surface by the coal's combustion product, namely, $CO_2$. In a methane fuel cell, $CO_2$ produced during the generation of electric energy dilutes the methane fuel gas at the anode surface. Additionally, it can be observed that the fuel-cell efficiency, giving:

$$E = \frac{\Delta G^\circ}{\Delta H^\circ}$$

wherein:
E=the fuel cell efficiency
$\Delta G^\circ$: changes in Gibbs free energy due to reaction
$\Delta H^\circ$: Heat of reaction
is higher for the fuel cell of one embodiment of the present invention fueled with the solid-state organic fuel with solid carbon as a major component than that for the methane fuel cell. Again, without being bound by theory, this result is believed to be due at least in part to the direct electrochemical oxidation of the solid-state carbon fuel, which produces a gaseous product. The theoretical efficiency of such a reaction is over 100%, which is obviously not practical. However, the high efficiency of the fuel cell can be attributed in part to the dramatic increase in entropy experienced by the conversion of a solid carbon-containing fuel to gaseous $CO_2$ in the fuel cell.

In addition to the electric energy, the fuel cell produces a product comprising a gaseous exhaust stream while generating electric energy. The exhaust stream comprises primarily $CO_2$, and according to embodiments of the present invention, the concentration of $CO_2$ of at least 50 mol %. Owing in part to the purity of the $CO_2$ in the exhaust stream, direct $CO_2$ sequestration can be performed on the exhaust stream to recover the $CO_2$ product. Similarly, the $NO_x$ concentrations within the exhaust stream are minimized within the operating temperature range of the fuel cell. Since the operating temperature of the fuel cell is generally less than the temperature required to produce $NO_x$, and because of the minimal nitrogen concentration in the solid-state organic fuel, $NO_x$ concentrations in the gaseous product produced by the fuel cell are generally less than about 1 mol %.

The production of CO in the gaseous product of the fuel cell is also minimized and is generally less than 5 mol % of the gaseous product. Reduction of the $CO_2$ in the gaseous product according to the reaction:

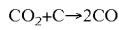

is minimized because of the active electrochemical-oxidation nature of the anode catalyst. CO within the gaseous product will be further oxidized almost immediately upon its formation due to the active-electrochemical oxidation properties of the anode catalyst, resulting in a gaseous product comprising no more than 10 mol % CO.

It used to be commonly accepted that generating electrical energy directly from a solid-state organic fuel without first gasifying and optionally reforming the solid-state organic fuel was not possible. Solid-state organic fuels, particularly coal, were considered to be unacceptable fuels because of the perceived fouling and sulfur-poisoning effects the coal and its resulting fly ash would have on the anode catalyst. Attempts to drive fuel cells directly using primary fuels, such as coal and oil, have not been successful due to fouling of the catalyst surface. A. Hamnett and P. Christensen, "Electrochemical and Photoelectrochemical Energy Conversion," ed. N. Hall, Cambridge, 2000, which is incorporated by reference herein in its entirety. One alternative was to gasify the coal or other solid-state fuel to phase suitable for consumption by a fuel cell. Unexpectedly, the sulfur-resistant materials included in the anode catalyst were discovered to be unable to form a stable sulfide within the operating temperature range of the fuel cell, thereby minimizing the effect of sulfur poisoning on the anode catalyst. Thus, considering an anode catalyst comprising Ag or Cu as the sulfur-resistant material, for example, would minimize the formation of the metal sulfide according to the following respective reactions:

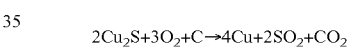

Comparable reactions occur with any of the sulfur-resistant materials, which are described above and defined as those materials that do not form stable sulfides within the operating temperature range of the fuel cell. The reaction temperature required for these two reactions to take place is about 460° C., thereby defining the minimum operating temperature of carbon-based fuel cell.

As mentioned above and detailed in WO 2006/028502, herein incorporated by reference, adherence of fly ash to the anode catalyst surface, commonly referred to as fouling of the anode catalyst, is minimized because the operating temperature of the fuel cell is below the fly ash fusibility temperature.

Both Ni and Cu can serve as current collectors and catalysts for the anodes. These anodes are further promoted with rare earth oxides to enhance their catalytic activity and durability.

The Ni/YSZ anode, which is active only for $H_2$ fuel, is further modified, in accordance with one embodiment of the present invention, by the addition of Cu and Ce precursors. The addition of Cu and Ce makes the Ni/YSZ active for electrochemical oxidation of coal. The preparation of these various embodiments are detailed below.

Referring back to FIG. 3 one embodiment shows the comparison made of a 40 μm thick Cu and Ce modified Ni/YSZ anode with a 100 μm thick YSZ disk and a 40 μm thick LSM/YSZ cathode on a fuel cell, the voltage versus current density analysis is performed at 750° C., 800° C. and 850° C. and a comparison was made with and without $D_2O$. Ohio #5 coal was utilized as the fuel and the electrical area used was 2.7 cm².

Figure 5:
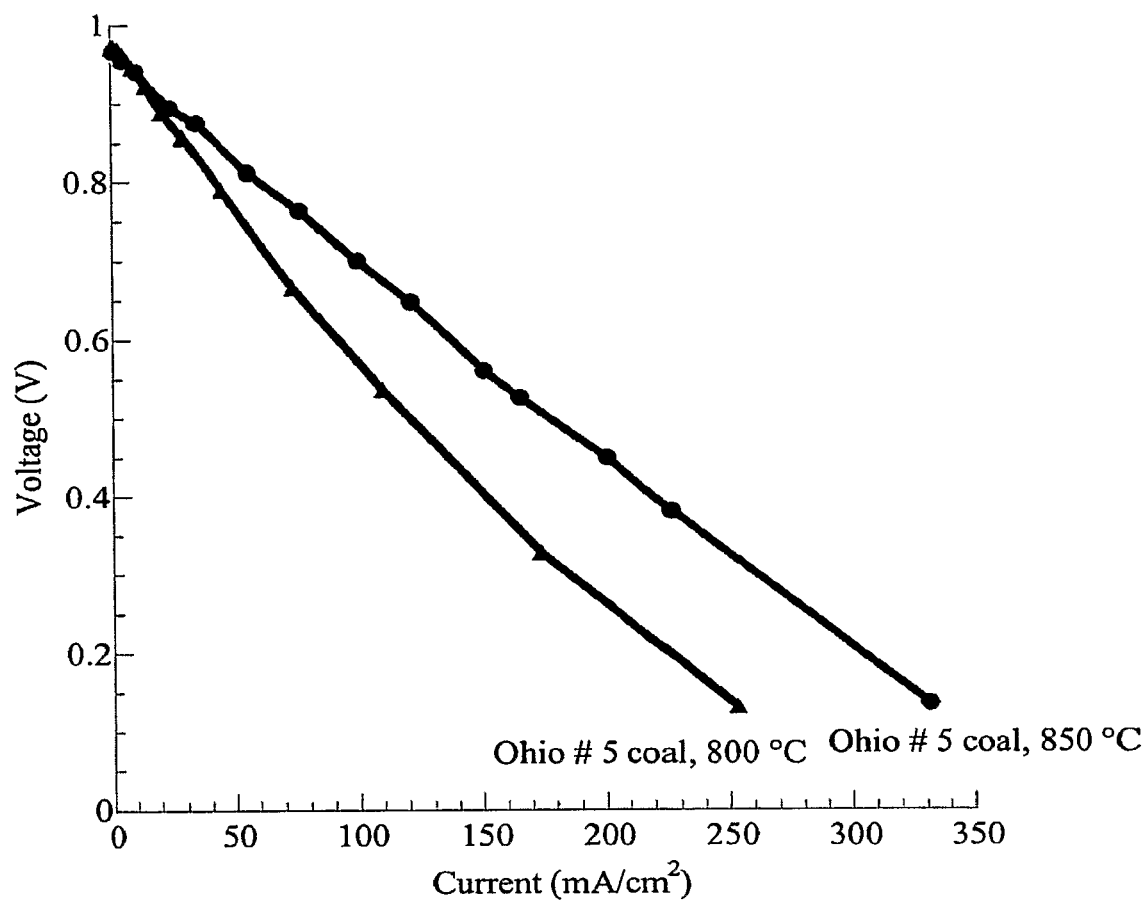
FIG. 5 is a plot of experimentally-determined values for voltage versus current density for a fuel cell operating with a Cu-anode, a YSZ electrolyte and a LSM-YSZ cathode.
Figure 6:
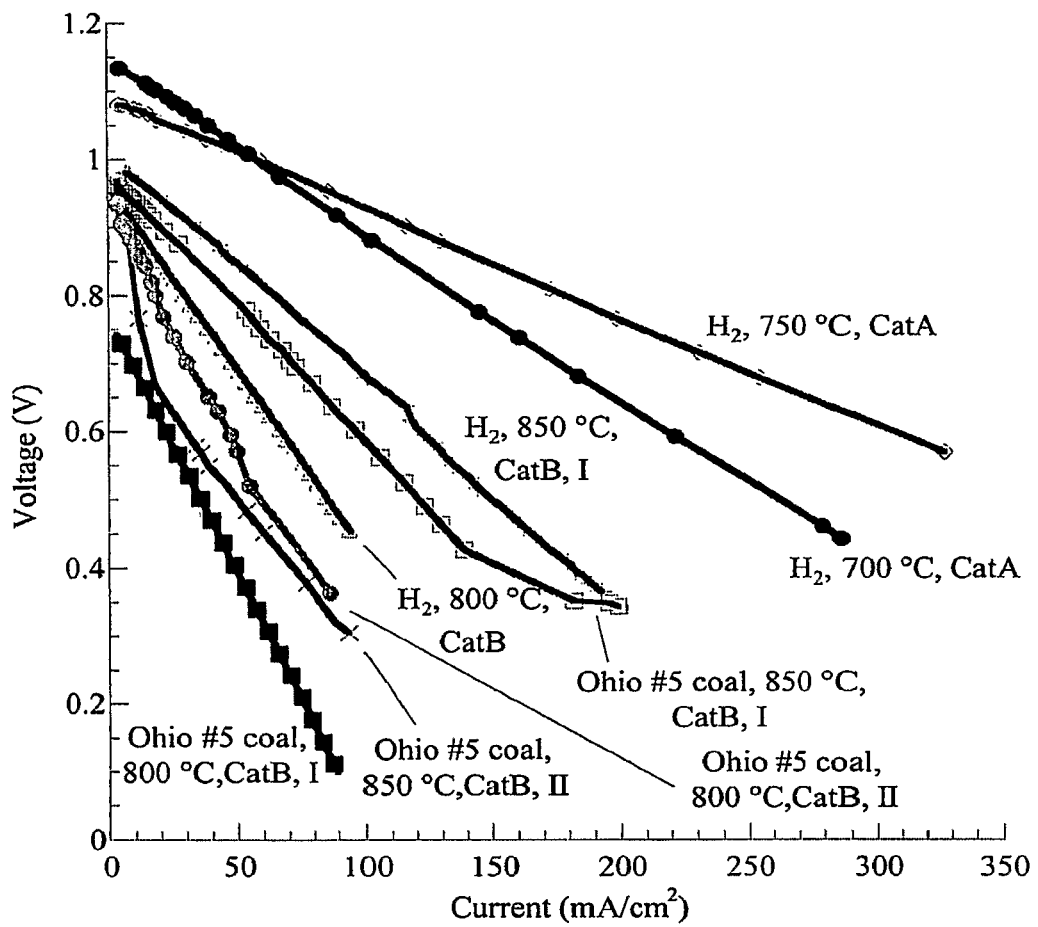
FIG. 6 is a plot of experimentally-determined values for voltage versus current density for a fuel cell operating with a CatA (Ni) or CatB anode, a ScSZ electrolyte and an LSM cathode.

A comparison of Ohio #5 coal at 800° C. and 850° C. is made in FIG. 5. Here the voltage versus current is compared for a Cu anode, a 1.4 mm thick YSZ electrolyte and a 50:50 LSM-YSZ cathode. A similar comparison is made in FIG. 6 utilizing a Cat A (Ni) or Cat B (Ni—Re) anode, a ScSZ (250 micron) electrolyte and an LSM cathode. The graph details the various fuels used, as well as the temperature.

Figure 7A:
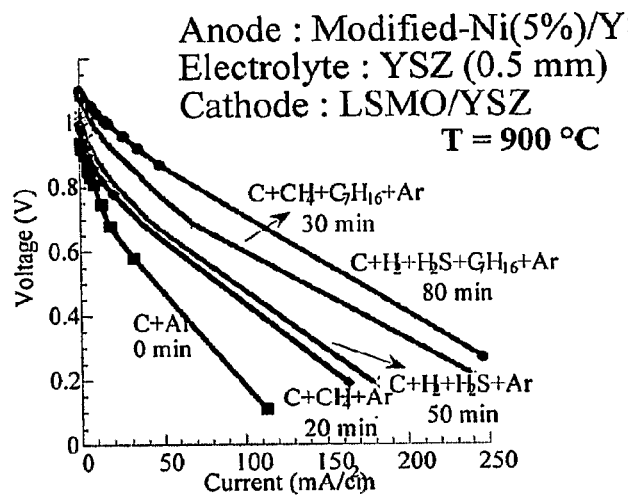
FIGS. 7(a) and 7(b) are plots of experimentally-determined values for voltage versus current density for a fuel cell operating with a Modified Ni/YSZ Fiber (75%) YSZ Powder (25%) anode, a YSZ electrode and a LSM/YSZ cathode.
Figure 7B:
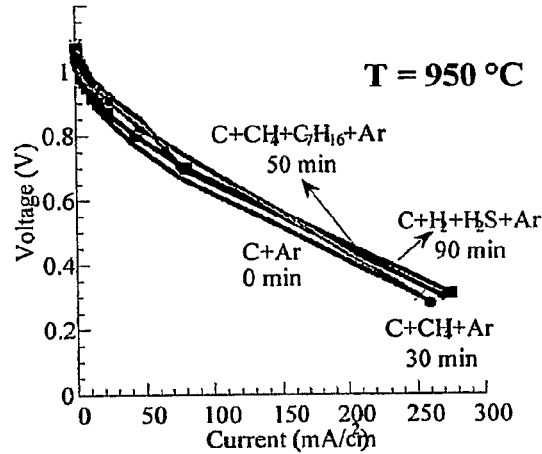

FIGS. 7(a) and 7(b) provide I-V curves for voltage versus current for modified metal anode solid oxide fuel cells for first energy petroleum coke. Various fuels are plotted using an anode of Modified-Ni(5%)/YSZF(75%)YSZP(25%) with a 0.5 mm thick YSZ electrolyte and an LSMO/YSZ cathode. YSZF is a YSZ in fiber form; YSZP is a YSZ in particle form. The various fuels are plotted at 900° C. (12a) and 950° C. (12b).

In another embodiment, the present invention involves the use of one or more perovskite which are stable against reduction by carbon or carbon-containing fuels and thus can serve as catalyst for coal fuel cells.

In one embodiment, the present invention involves the use of one or more highly active carbon oxidation catalysts in connection with a solid oxide fuel cell for the electrochemical oxidation of solid carbon fuels to produce electricity and $CO_2$.

In another embodiment, the present invention involves the use of a solid oxide fuel cell that contains one or more of the catalysts disclosed herein. In this embodiment, such a solid oxide fuel cell can serve as a direct carbon fuel cell which offers a number of advantages that include, but are not limited to: (i) the minimization of $NO_x$ emissions due to an operating temperature range of 700 to 1000° C.; (ii) a high overall efficiency because of the direct conversion of coal to $CO_2$; (iii) production of a nearly pure (>99%) $CO_2$ exhaust stream for direct $CO_2$ sequestration; and (iv) low investment and maintenance costs due to the simplicity of the power generation process.

Preparation of an Ni/YSZ Anode

One method for preparing a Ni/YSZ anode includes the preparation of an NiO/YSZ slurry. Ni/YSZ (YSZ: Yttrium-stabilized Zirconia) contains Ni which serves as a current collector and an active catalyst for anode. The Ni/YSZ (with a weight ratio of 70/30) electrode has a porous structure anode. The high Ni content enhances the electrical conductivity to facilitate the current collection. This 70/30 Ni/YSZ ratio is one of many embodiments which can be used in the present invention. For example, an electrode containing 30 wt % Ni also performs even though it has a lower electric conductivity than the 70 wt % Ni electrode. The following provides an example to explain the steps for the preparation of this Ni anode fuel cell. These steps are the standard tape casting procedures which can be found in the book (Richard E. Mistier and Eric R. Twiname, "Tape Casting—Theory and Practice," The American Ceramic Society, Westerville, Ohio, 2000), which is incorporated herein by reference.

Tape casting of YSZ thin films. YSZ powder is de-agglomerated and dispersed in the solvent such as cyclohexaone, ethanol, butanol, amyl acetate, acetone chloroform, 1,1,1, trichloroethylene (TCE), toluene, xylene, ethanol, methyl ethyl ketone (MEK), and solvent of the combination of these individual species) with the aid of dispersants (such as Herring oil, Menhaden oil, Hypermer KD1, KD2, KD3, and KD4). Binders (such as methyl cellulose, polyvinyl alcohol, polyvinyl butyral), plasticizers (n butyl phthalate, polyalkylene alcohol, polyethylene glycol, butyl benzyl phthalate, or their mectures), pore former (carbon black, polymer particle, fiber, and carbon fiber) are added; the slurry is then homogenized. Homogenization is carried out by ball milling for 24 hours. The slurry is kept rotating at a slow speed for de-airing and preventing settling.

The YSZ tape is prepared by tape casting of the YSZ slurry with a doctor blade at a constant speed on a plastic film such as mylar.

Tape Casting of Porous Ni/YSZ Anodes.

The Ni/YSZ tape is prepared by the same approach as the YSZ tape with the addition of NiO particle and organic solvent amyl acetate/acetone during the preparation of the slurry. Due to the addition of the Ni particles, the adjustment of solvent, binder, and plasticizer is needed to obtain a quality Ni/YSZ tape.

Laminating.

The laminating of the Ni/YSZ and YSZ tape is prepared by spraying Terpinol/ethanol vapor on the surface of the Ni/YSZ tape, pressing both tapes together with a laminator and then further pressing at a pressure from 1 to 10 tons.

Firing.

Calcination of the laminated layer is achieved in two steps: (i) first heating at a slow rate from room temperature to 900 to 1100° C. and then slowly cooling down to room temperature for a total of at least 60 hours and (ii) heating from room temperature to 1300 to 1600° C. and holding at that temperature for 1 to 5 hours and then cooling down.

Pasting Cathode layer.

A LSM (Lanthanum Strontium Manganite)/YSZ cathode layer and a pure LSM layer was applied on the YSZ surface of the fired laminated Ni/YSZ electrode and YSZ electrode by screen printing. The fuel cell assembly containing anode/electrolyte/cathode were further sintered at 1250° C. for 2 hours.

Figure 8:
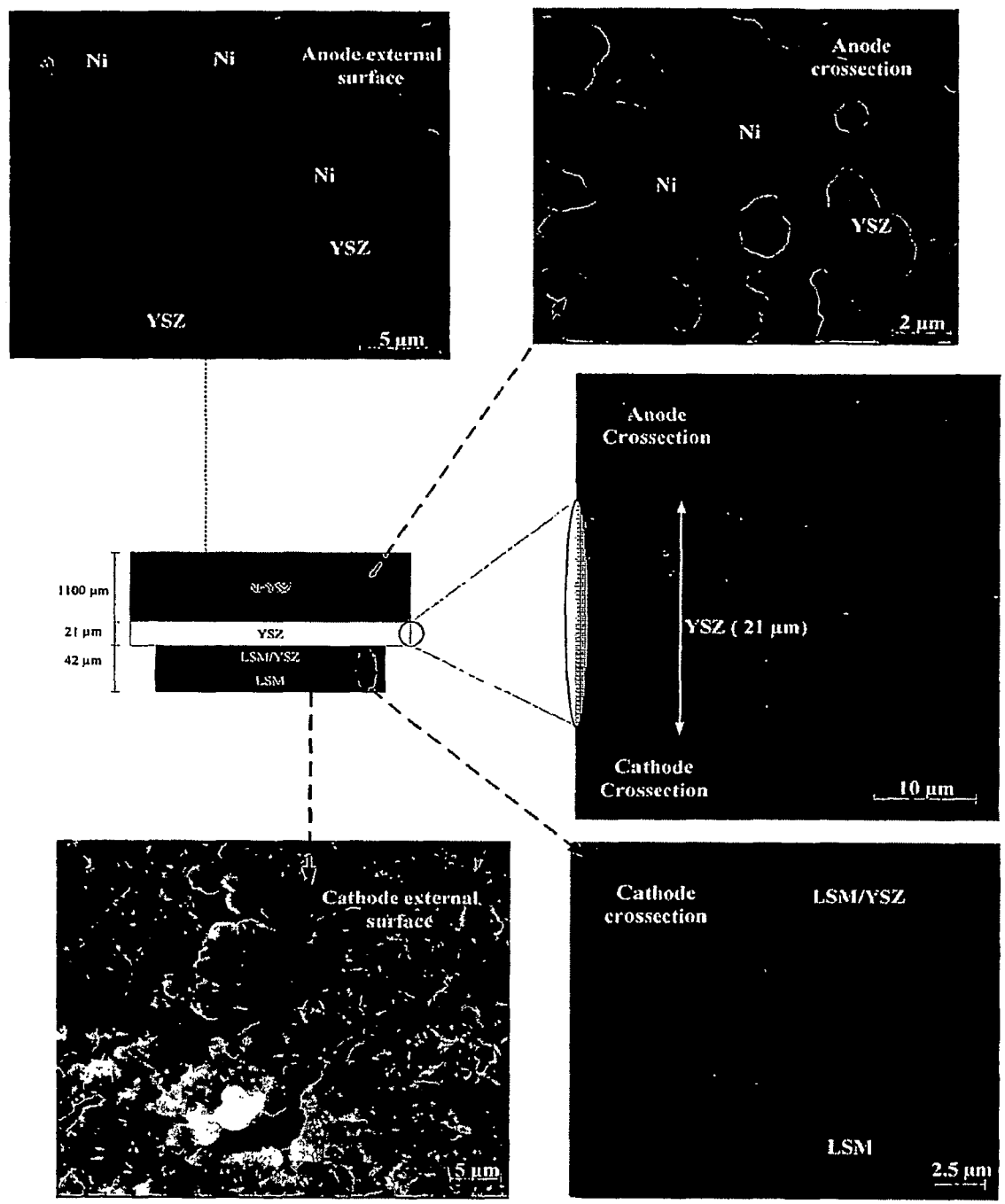
FIG. 8 are SEM images detailing the Ni/YSZ anode, the YSZ electrolyte and the LSM/YSZ cathode.
Figure 9:
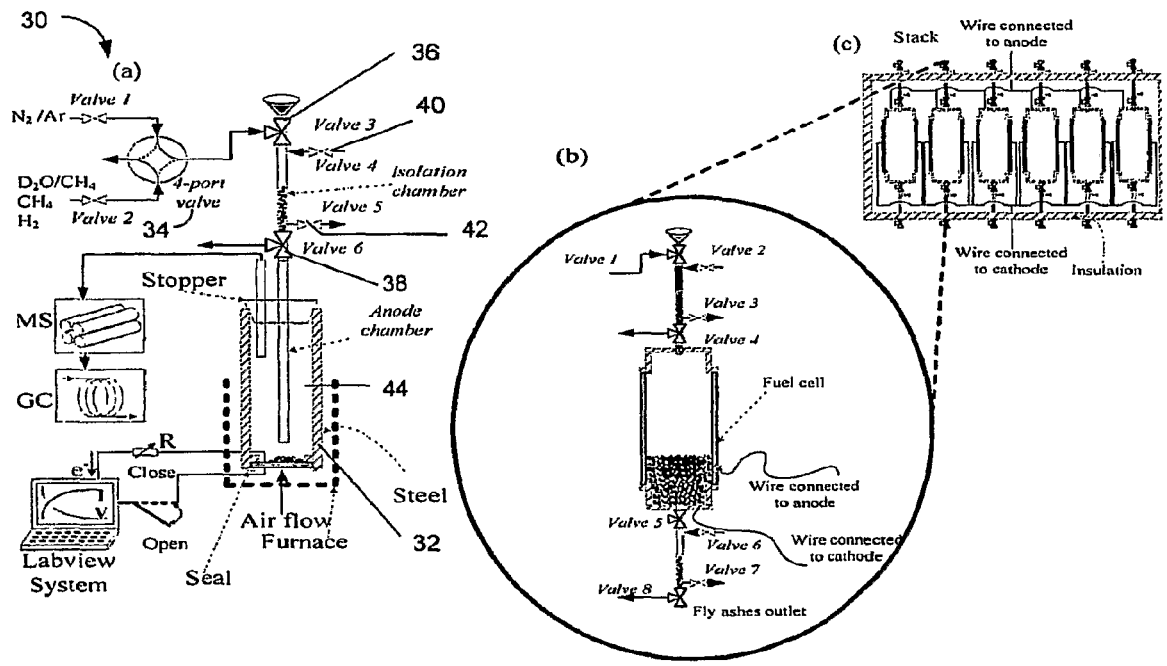
FIG. 9(a) details a view of the fuel cell testing unit.

The fuel cell prepared is attached a testing unit shown in FIG. 9(a). Detailed microscopic photos of this fuel cell can also be seen in FIG. 8 which shows Ni particle size in the range of 3-8 μm. The larger Ni particles being more resistant to coking than smaller Ni particles. A similar finding is described in Toebes, et al., Catalysis Today 76 (2002) 33-242, herein incorporated by reference. The fuel cell 30 fabricated by the above procedure is attached to either zirconia or steel tube 32 shown in FIG. 9(a) for measuring performance of fuel cell. The inlet flows including Ar, $N_2$, $H_2$, $CH_4$, or $CH_4$ with 3 vol % $D_2O$ (i.e., $D_2O/CH_4$) are used. A 4-port valve 34 is utilized to switching the flow (i.e., step switch) from one to another into the fuel cell. The arrangement of the three-way valve 36 and 38 as well as two valve 40 and 42 allows injection of solid fuel such as coal without bringing air into the anode chamber. Coal or coke is injected by opening valve 36 and closing valve 38 to the isolation chamber. Air in the isolation chamber is purged out by closing valve 36 and 38 and opening valve 40 and 42. After purging air in the isolation chamber, valve is open to inject coal into anode chamber 44.

The anodes of the fuel cell prepared by the tape casting method can attach to the metal frame work with a ceramic seal, a seal with a comparable thermal expansion coefficient as the metal used, in one embodiment this being YSZ and steel. In another embodiment this means for securing the anode, cathode and electrolyte is a metal tube, a metal framework, a metal structure or a metal plate. This means for securing in some embodiments having a means for feeding organic fuel. The steel can be manufactured by various methods with one embodiment utilizing Fe and Cr as major components and C, Mn, P, S, Si, N, Ti and Al as minor components. By varying the makeup of the steel stable conductivity for more than one month of operation is possible. Various embodiment are possible for the steel makeup, such steel makeups include, but are not limited to 409, 439, 304, 316 and FeCralloy™. Favorable results and yields being found with the use of 439 with the 304 and 316 embodiments experiencing less favorable performance.

The seal used can vary but in one embodiment is a high temperature ceramic adhesive, such an adhesive being Aremco 571 (as manufactured by Aremco Co.). The seal being used to secure the fuel cell to the frame work, tube, structure or plate.

The cathode is exposed to the static air and the fuel cell remains constant at 750° C. for all testing. The composition of the fuel cell exhaust is analyzed by a Mass spectrometer (Pfeiffer Vacuum Omnistar, GSD 301 O2) and Gas Chromatography (GC, SRI 8610C) equipped with Helium Ionization Detector (HID). The fuel cell current and voltage are measured simultaneously by Labview system 0.25 second. The m/e (i.e., mass/electron) ratios monitored by MS were 2 ($H_2$), 3 (HD), 4($D_2$), 15 ($CH_4$), 28 (CO), 32 ($O_2$), 40 (Ar), and 44 ($CO_2$). A 1 ml of gas sample from the fuel cell effluent is taken by syringe and injected into GC for quantitative analysis when the fuel cell is operated at the relatively steady state. Because $H_2$, HD, and HD can not be differentiated by GC, their mole amounts are assumed to be proportional to their corresponding MS intensities.

In another embodiment, as detailed in FIG. 9(c), a stack of fuel cells can be utilized. In this setup multiple fuel cells are interconnected electrically to one another.

Figure 10:
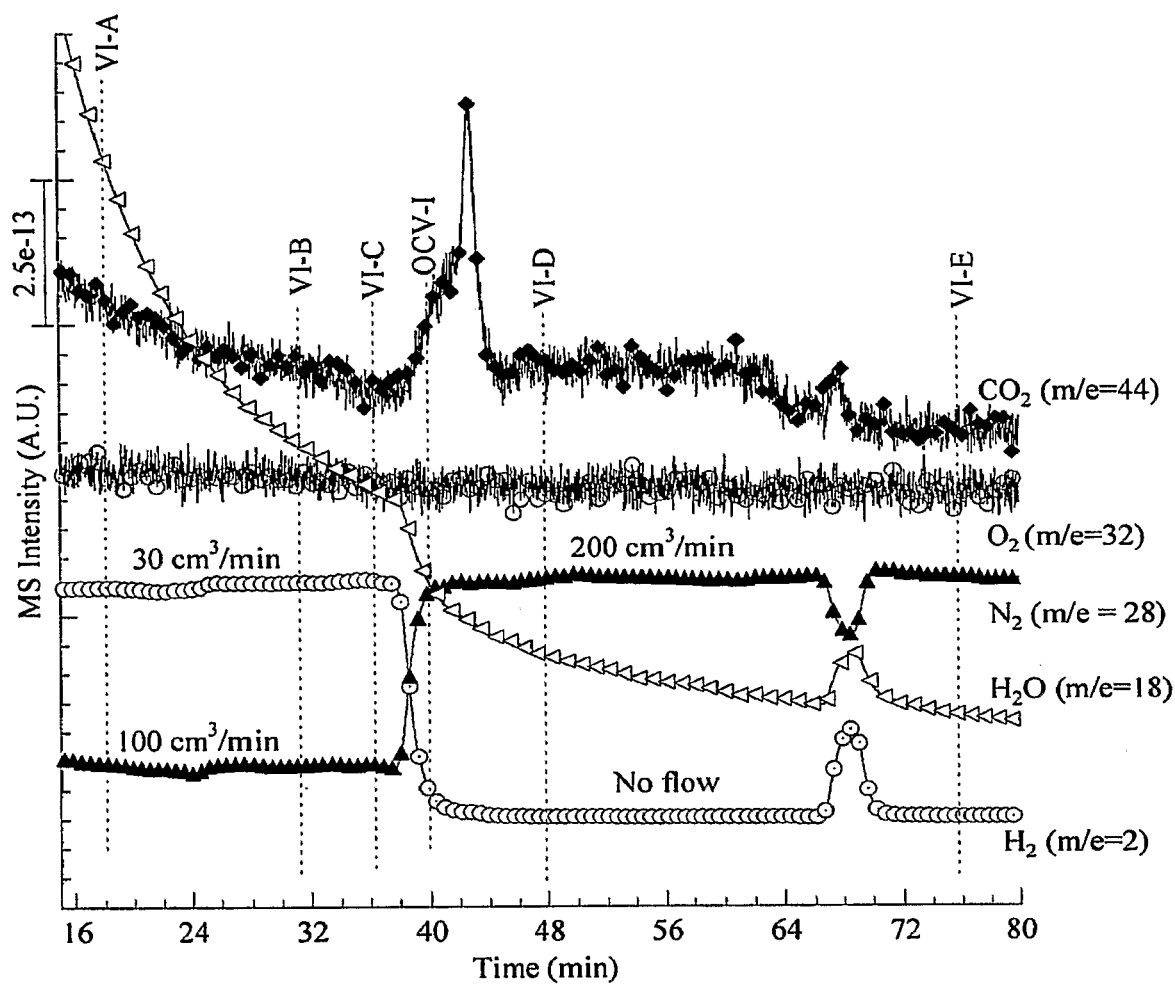
FIG. 10 is a graph of the MS profiles of the fuel cell effluent using hydrogen and coke solid oxide fuel cell at 800° C.
Figure 11:
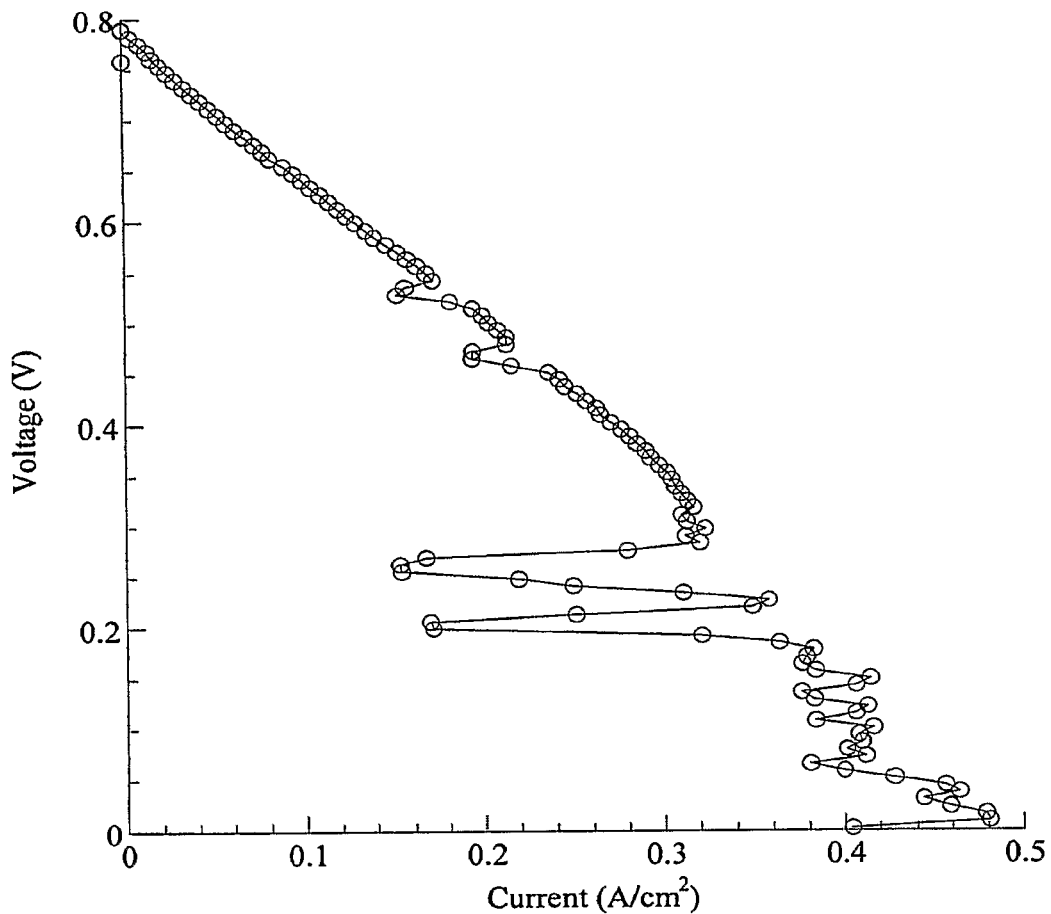
FIG. 11 is a graph of the current density and voltage relationship for a mixture of coke and $H_2$ (30 cm$^3$/min) using Ni-YSZ as anode at 800° C. (corresponding to VI-A in FIG. 11)
Figure 12:
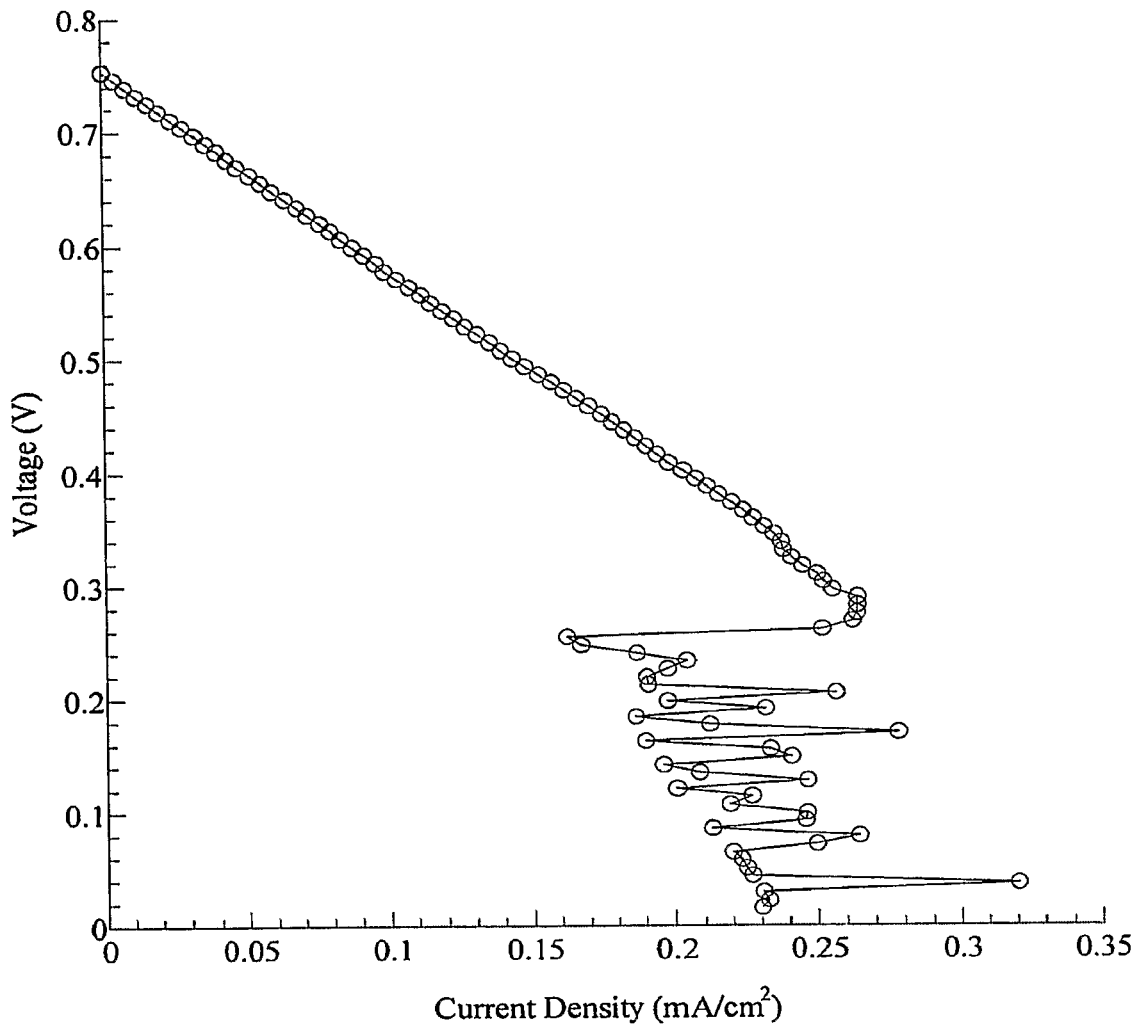
FIG. 12 is a graph of the current density and voltage relationship for a mixture of coke and $H_2$ using Ni-YSZ as anode at 800° C. (corresponding to VI-B in FIG. 11)
Figure 13:
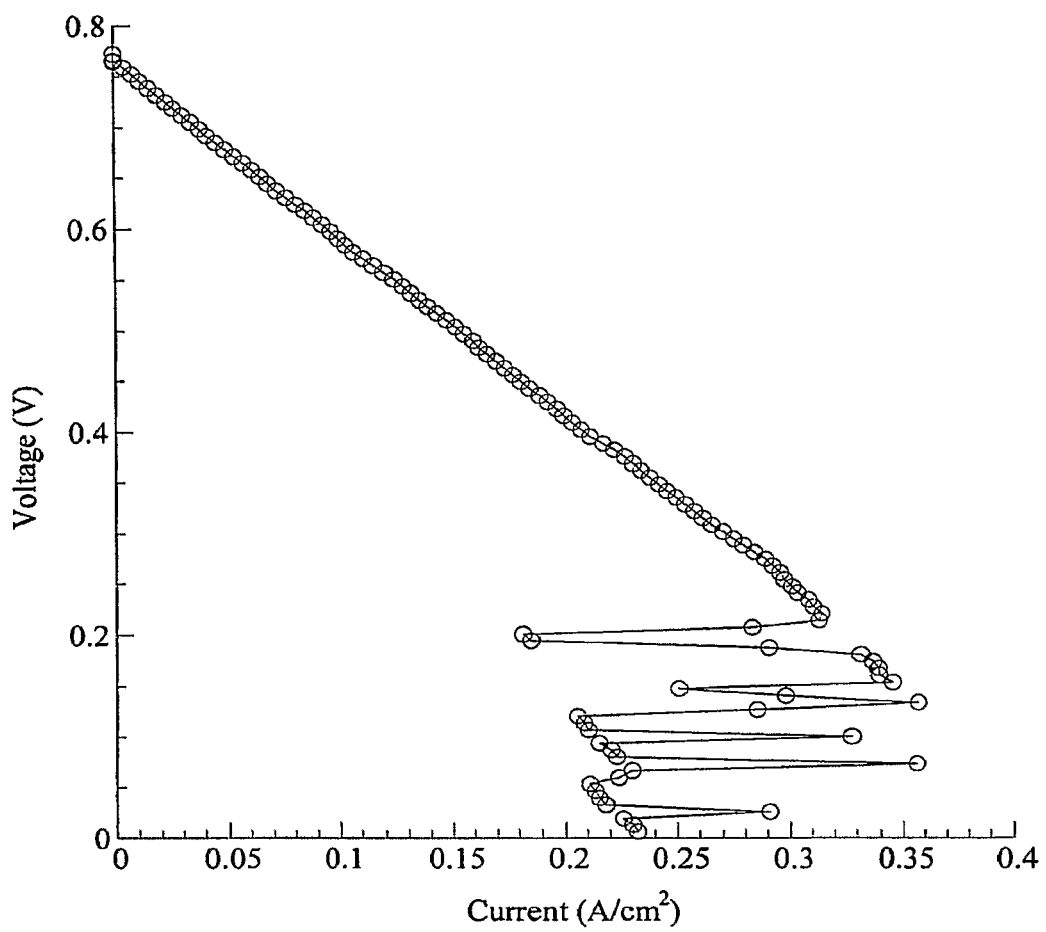
FIG. 13 is a graph of current density and voltage relationship for coke and hydrogen using Ni-YSZ as anode at 800° C. (corresponding to VI-C in FIG. 11)

FIG. 10 shows the composition of the effluent of the Ni/YSZ anode fuel cell with hydrogen and coke as a fuel. Coke is produced by devolatilzation of Ohio No. 5 coal. The devolatization removes coal tar and gaseous species. Coke is placed on the anode surface of Ni-anode fuel cell, which is prepared by the above methods. The fuel cell is heated from room temperature to 800° C. for 3 hours under 30 cc/min of flowing hydrogen and 100 cc/min of flow $N_2$. Flowing $H_2$ over coke on the anode surface produces $H_2O$ and $CO_2$. The concentration of $H_2O$ and $CO_2$ decreases with time when fuel cell temperature is kept at 800° C. FIG. 11 details the V-I curve taken at t=16 min after fuel cell temperature reaching 800° C. The open circuit voltage (OCV) is at 0.8 V. The voltage decreases with increasing current. Below 0.3 V, the current showed a drifting behavior which results from contact between coke and the anode surface during the high current condition. Similar I-Vs were obtained at t=31 and 36 min, as detailed in FIGS. 12 and 13.

Figure 14:
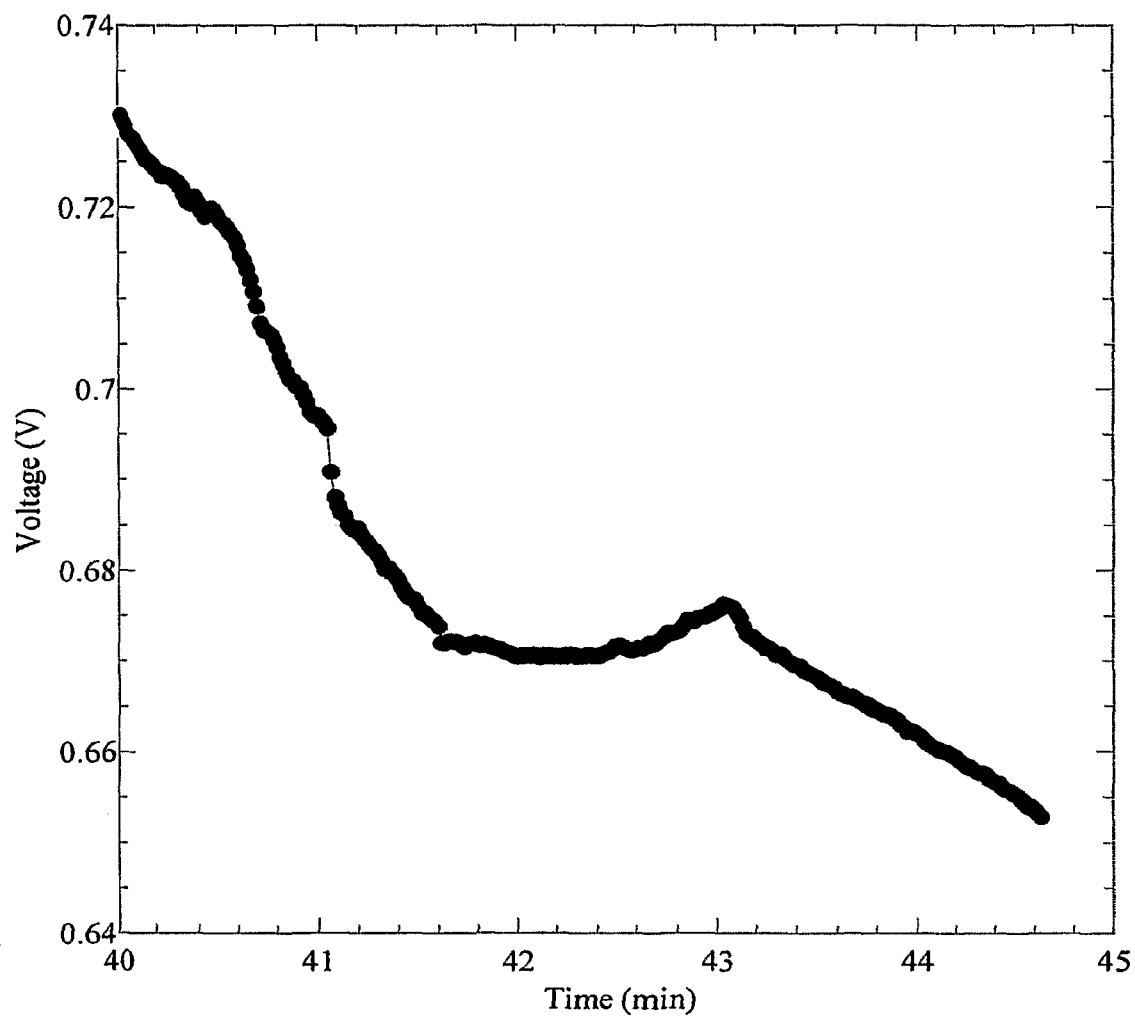
FIG. 14 is a graph of the OCV of coke at 800° C. (corresponding to OCV-I in FIG. 11)
Figure 15:
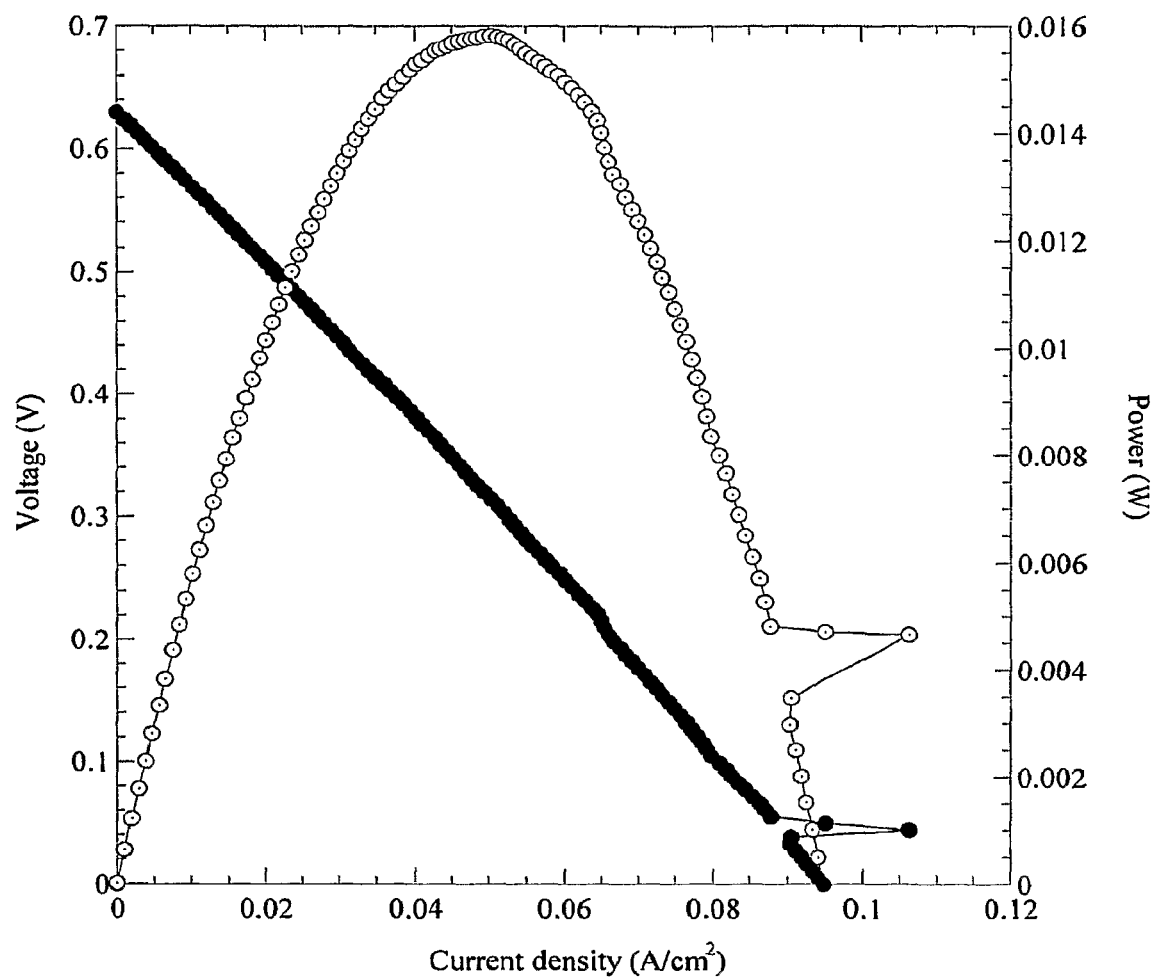
FIG. 15 is a graph of the current density and voltage relationship for coke using Ni-YSZ as anode at 800° C. (corresponding to VI-D in FIG. 11)
Figure 16:
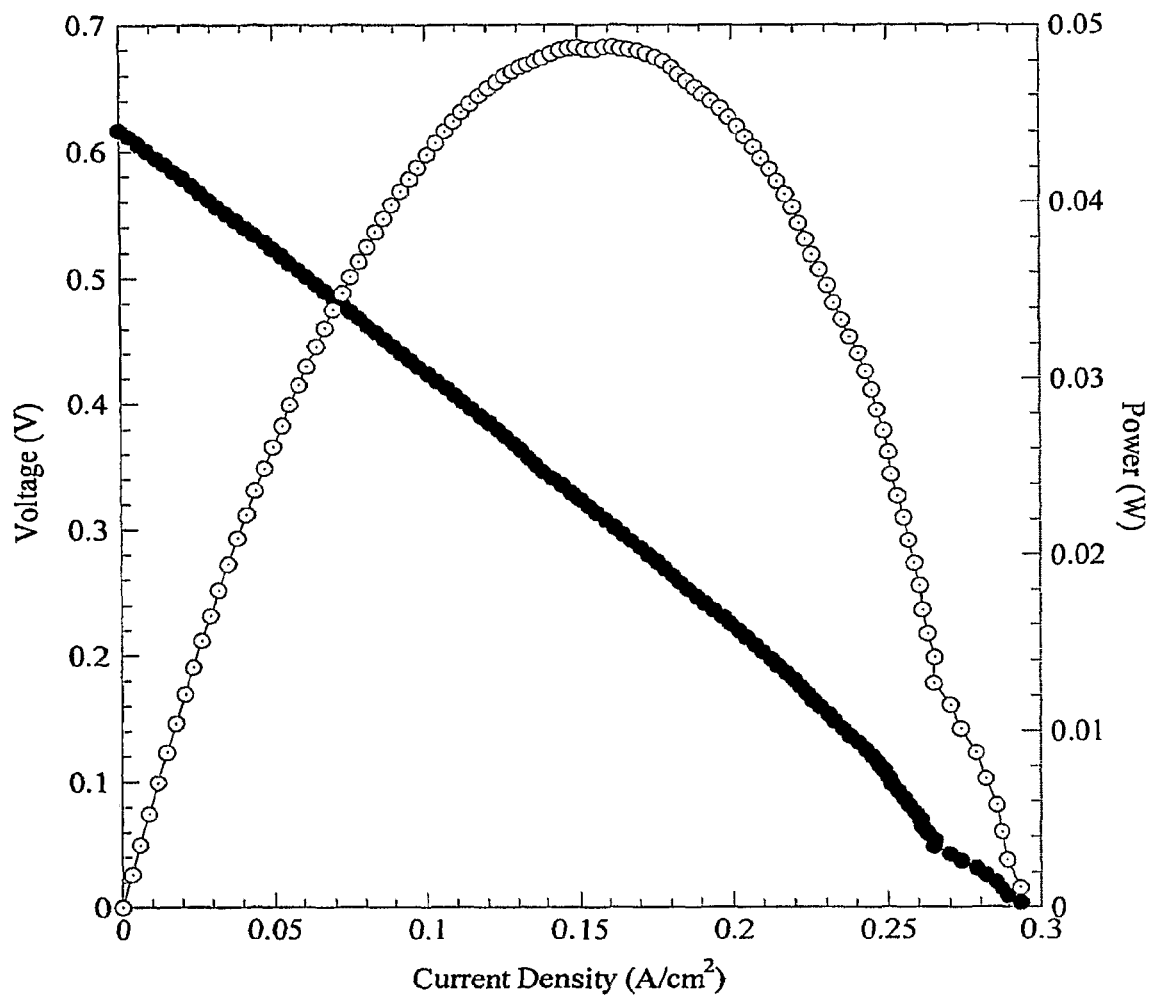
FIG. 16 is a graph of the current density and voltage relationship for coke using Ni-YSZ as anode at 800° C. (corresponding to VI-E in FIG. 11)
Figure 17:
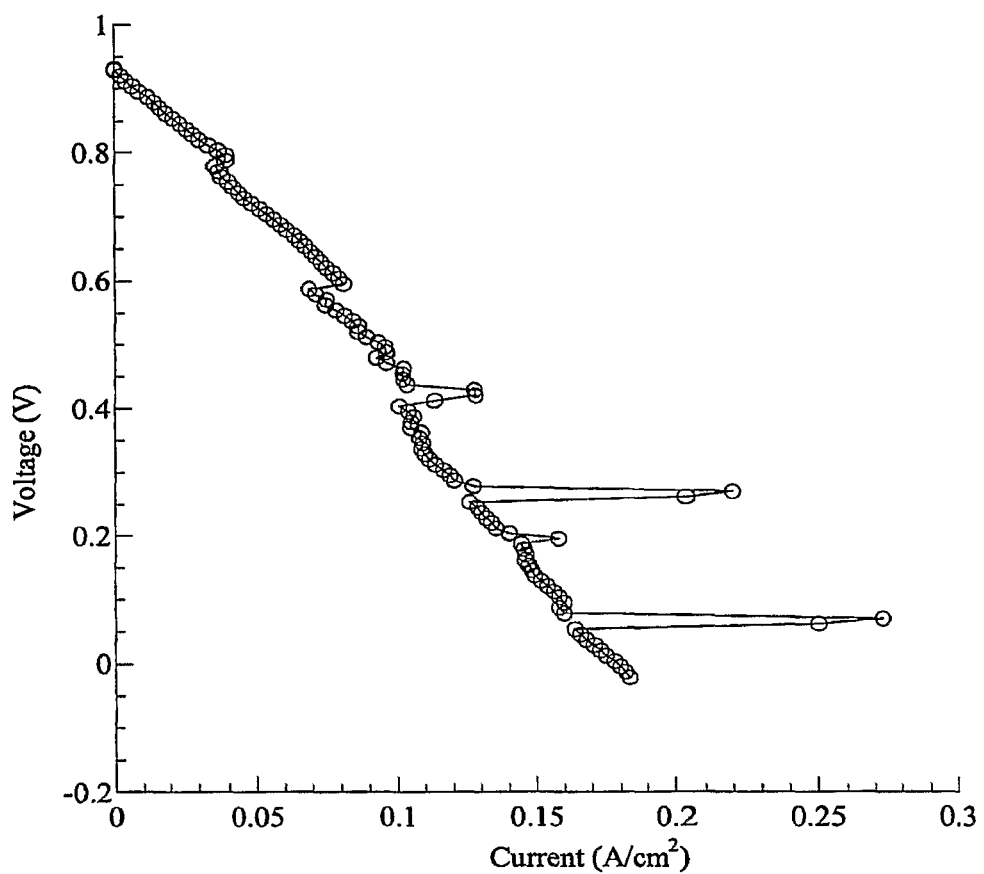
FIG. 17 is a graph of the current density and voltage relationship for coke and $H_2$ using Ni-YSZ as anode at 800° C. after 16 hours.

At time=38 min, the $H_2/N_2$ flow is switched to a pure $N_2$ flow. FIG. 14 details terminating $H_2$ flow causing the OCV to decrease to 0.65 V. FIG. 10 shows terminating $H_2$ flow causing an overshoot in $CO_2$ concentration, indicating $H_2$ competes over carbon from coke for $O^{2-}$. Terminating $H_2$ allowed $O^{2-}$ to travel to the anode surface to react with carbon in coke. The VI curve in FIG. 15 was taken at 48 min, showing the VI curve is lower than that of VI taken in FIGS. 12 and 13 when $H_2$ is present. Stirring the coke by shaking the fuel cell resulted in increasing power density as shown in the VI curve in FIG. 16. Stirring coke removed part of the flyash on the coke surface, resulting in increasing current output. FIG. 17 shows the fuel cell remain active in producing electricity in the presence of both coke and $H_2$ after 16 hours of operation at 800° C.

Alternate Embodiments Detailing the Use of Large Ni Particle-Based Catalysts Comparing Coal and $H_2$ Fuel.

A quartz reactor is designed and fabricated for the determination of coal and fly ash distribution on the surface of the anode catalyst. A Ni/YSZ anode-supported cell with 1" diameter is placed inside the quartz reactor and sealed with a cogebi mica gasket. One embodiment involves heating the fuel cell to 800° C. at a heating rate of 3° C./min in flowing 20 cc/min dry $H_2$. When the fuel cell V-I curves exhibited a stable behavior, the fuel cell is subsequently cooled down to room temperature. The purpose of this step is to reduce the NiO in the anode to Ni metal.

A second embodiment involves loading 1.0 g of devolatilized Ohio #5 coal (i.e., coke), and re-heating back to 800° C. under flowing 120 cc/min $N_2$ and 25 cc/min $H_2$. Coke is used for avoiding the formation of coal tar which could smear the quartz, affecting direct observation of flyash and coke particle distribution. This is to insure that Ni is in the reduced state prior to determining the performance of fuel cell with coke as a fuel.

The third embodiment determines the fuel cell performance with coke as fuel in the presence of inert gas, $N_2$. During these three experimental embodiments, fuel cell performances and effluent gas composition are constantly monitored during the reduction of the anode catalyst as well as during the oxidation of coke and coke/$H_2$ using a Solarton 1400 CellTest system, GC, and MS spectrometer.

Figure 18:
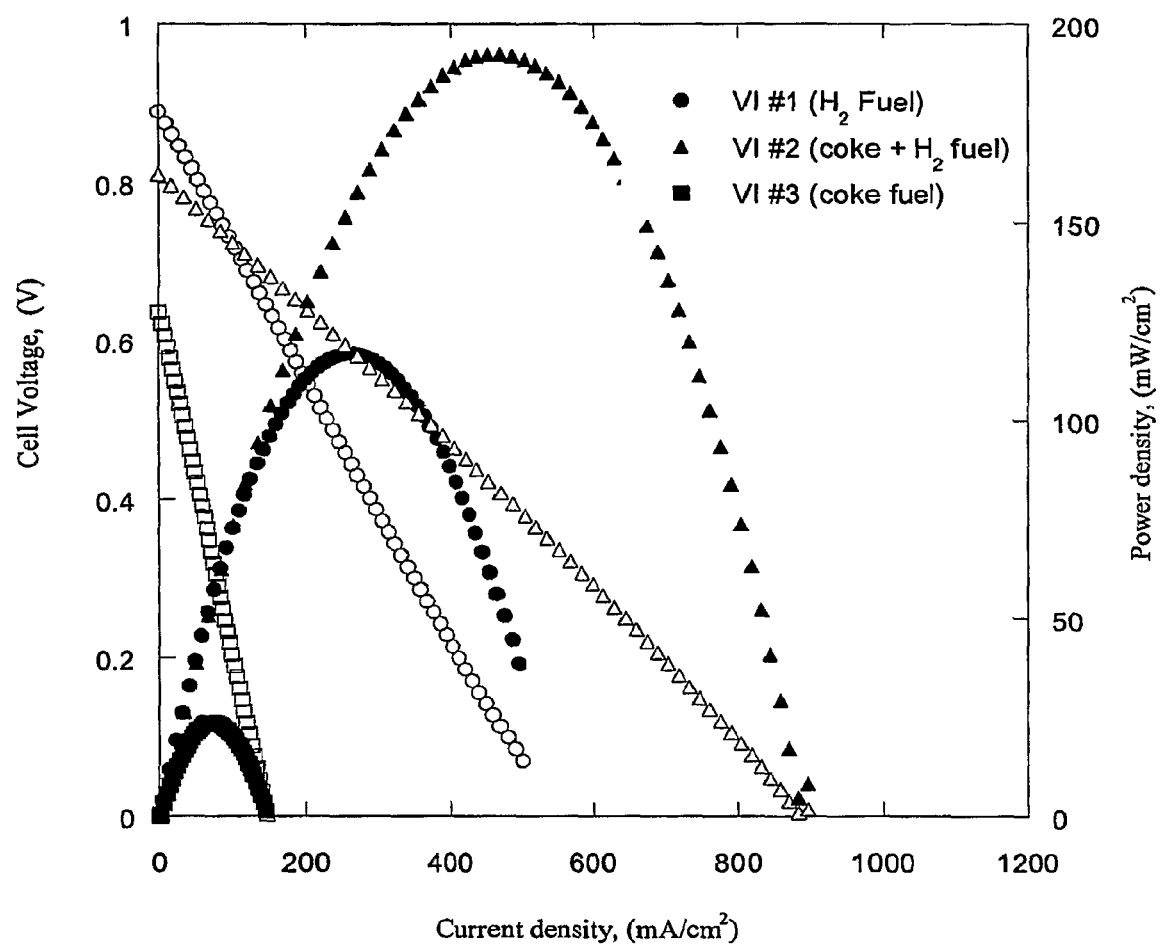
FIG. 18 is a graph of V-I curves for the fuel cell operating on $H_2$, coke, and $H_2$+ coke.

FIG. 18 shows the characteristic V-I curve obtained when operating the fuel cell on $H_2$, devolatilized coal (i.e. coke), and coke+$H_2$ at 800° C. In embodiment #1, the fuel cell was exposed to $H_2/N_2$. During this initial reduction of anode catalyst, OCV developed relatively slowly, reaching a maximum of 0.9 Volts after 1 hour of operation. A stable maximum current density of 500 mA/cm² was achieved after 5 hours of operation. The VI curve measured at t–5 hours is shown in FIG. 18. Previous attempts to conduct this part of the experiment resulted in short circuiting of the fuel cells, possibly because of a rapid heating/cooling cycle. Inspection of the cell after slow heating cooling cycles showed no short circuiting, and no visible cracks on the cell. These results show a slow heating is essential for prevent cracking of thin electrolyte.

In embodiment #2, coke was loaded and the reactor was re-heated in flowing 25 cc/min $H_2$ and 120 cc/min $N_2$. The fuel cell shows a rapid development of the OCV (0.8 V at 300° C. and 1.02 V at 700° C.), however, as the temperature reached 800° C. the OCV decreased to 0.8 V, due to increased leak related to partial decomposition of the mica gasket or softening of the springs. The VI curves obtained at 800° C. in the presence of coke and $H_2$ revealed a significant increase in the fuel cell performance, reaching a maximum current density of 895 mA/cm², as shown in FIG. 18.

In embodiment #3, $H_2$ flow was suspended from entering the fuel cell, $N_2$ was used to purge the reactor, and the cell was operated solely on coke (GC and MS were used to verify the absence of $H_2$ inside the cell). The V-I curves obtained revealed a maximum current density of 146 mA/cm², and the simultaneous evolution of $CO_2$, as evidenced by MS profiles in FIG. 19 and corroborated by GC.

Figure 19:
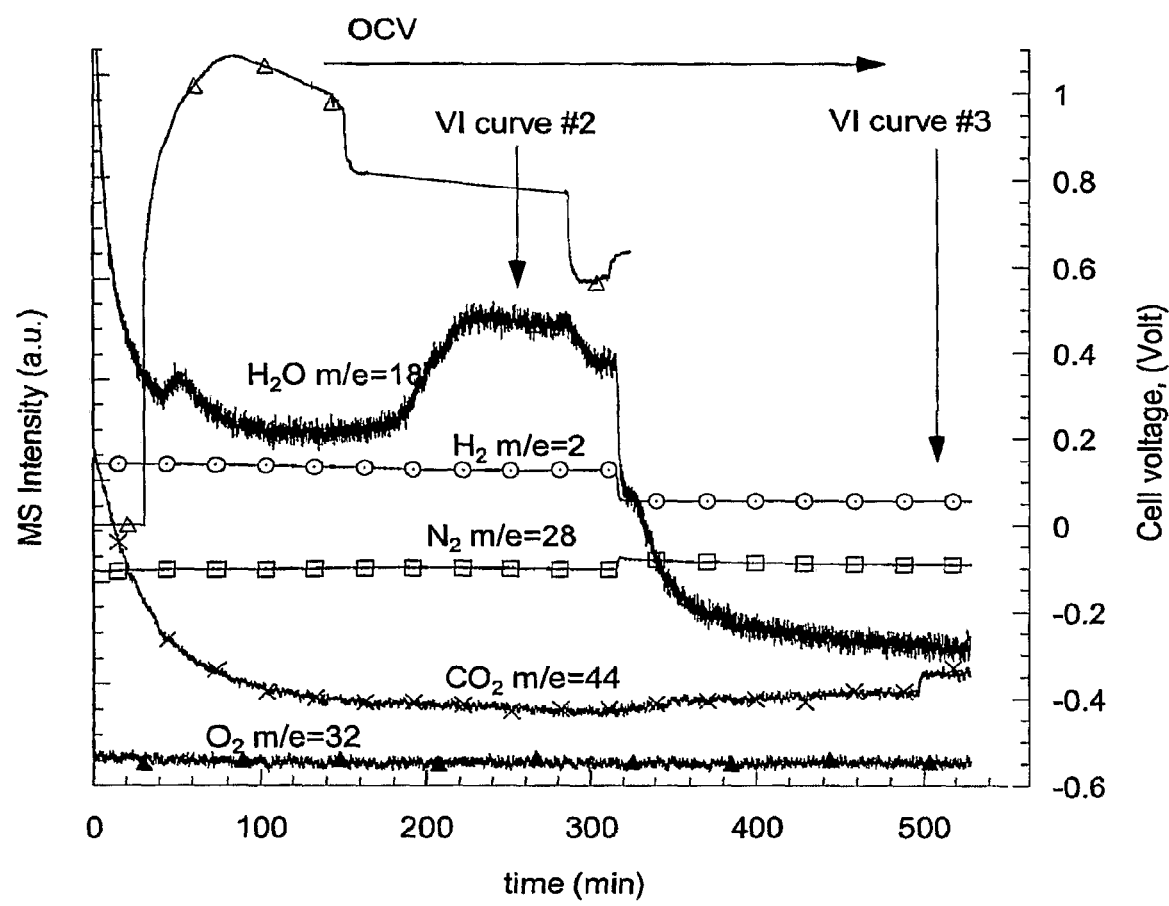
FIG. 19 is a graph of MS profiles during the electrochemical oxidation of coke and $H_2$.

FIG. 19 details the corresponding MS profile of $H_2$, $N_2$, $O_2$ and $CO_2$ during the electrochemical oxidation of coke and $H_2$. During the initial part of the embodiment (#2), a majority of the electricity produced (i.e. V-I curve #2) results from the electrochemical oxidation of $H_2$, whereas in the latter part of the embodiment (i.e. V-I curve #3), results in the rapid evolution of $CO_2$.

After the performance evaluation, the cell was slowly cooled in order to determine the distribution of coke and fly ash on the anode electrode.

A majority of the coke found inside the quartz reactor had a black appearance, and only a small amount of white ash was found, (very light, and electrically charged) mostly deposited around the perimeter of the anode electrode, (very close to the mica seal gasket), on top of the copper current collector, and, in direct contact with the anode catalyst, under the black unreacted coke. There was also ash seen in direct contact with the copper anode current collector.

Preparation of Cu—Ni Anode

Figure 20:
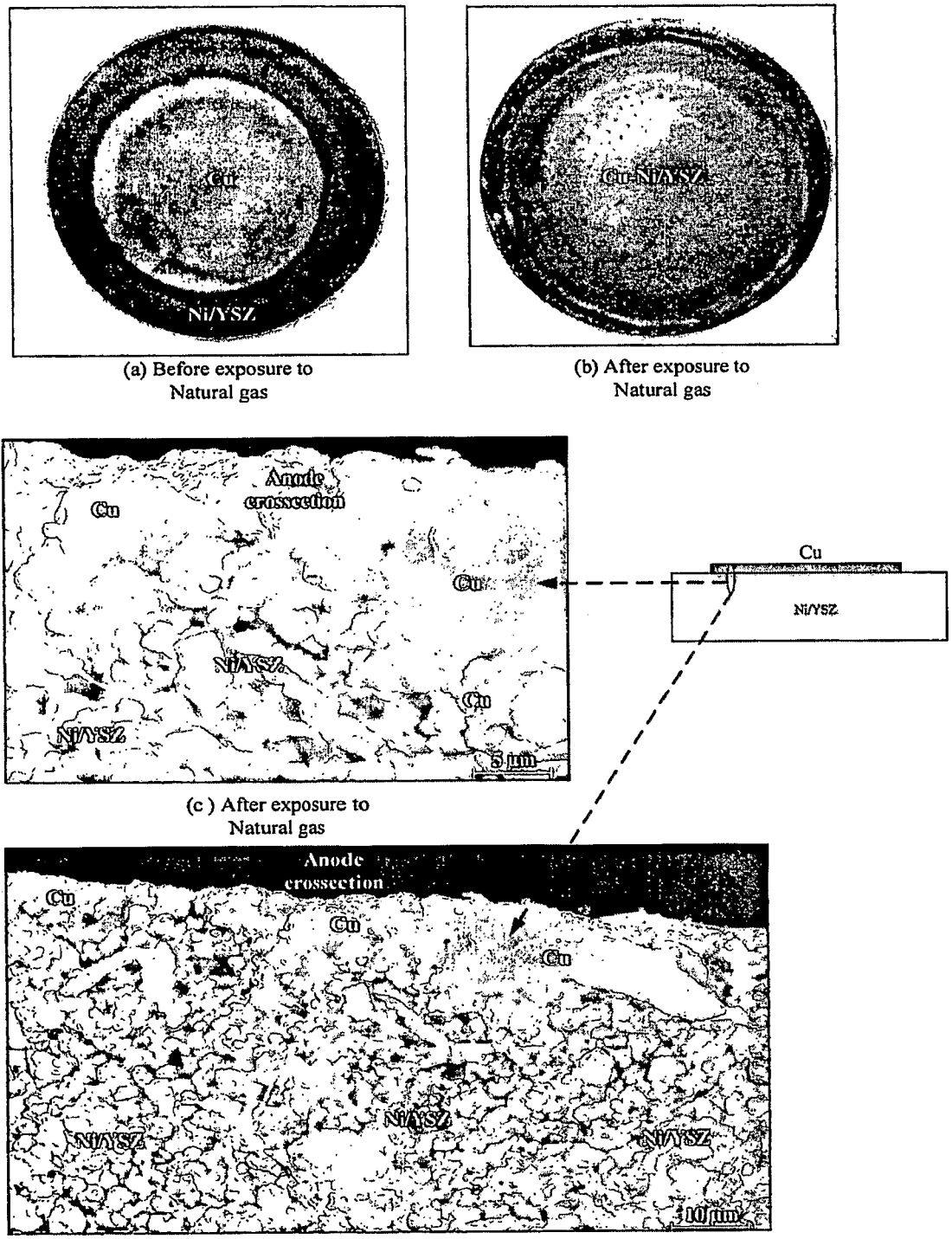
FIGS. 20 (a) and (b) are photographs of the Cu-plated Ni anode changing after exposure to natural gas with (c) being SEM photographs of the Cu as located on the surface of the Ni/YSZ anode.

The anode of the fuel cell prepared by tape casting method above is further electroless-plated with Cu. The Ni/YSZ anode is cleaned with 1 N NaOH at 65° C. for 15 min and then 25 vol % $H_2SO_4$ at 35° C. for 15 min. The cleaned Ni/YSZ anode is sensitized with 20 g/l $SnCl_2$ and 40 ml/l HCl solution at 25° C. and then activated with 0.25 g/l $PdCl_2$ solution and 0.5 ml/l HCl solution at 45° C. for 25 min. The resulting Ni/YSZ anode is dried at 110° C. for 15 hours. Electroless plating of Cu on the dried Ni/YSZ anode is achieved by using a plating bath solution of 0.04 M $CuSO_4$, 0.08 M EDTA. 4Na, 0.08 M HCHO and 5 ppm pyridine at 70° C. and a pH of 12.5 with constant agitation for 30 min. The Cu-plating anode is washed with distilled water and dried at 110° C. for 24 hours. FIGS. 20 (*a*) and (*b*) details the color of Cu plated Ni anode changed from bronze to gray. The SEM images in FIG. 20 (*c*) shows Cu is located primary on the surface of the Ni/YSZ anode and no carbon was produced on the anode surface after running the fuel cell with natural gas.

Figure 21:
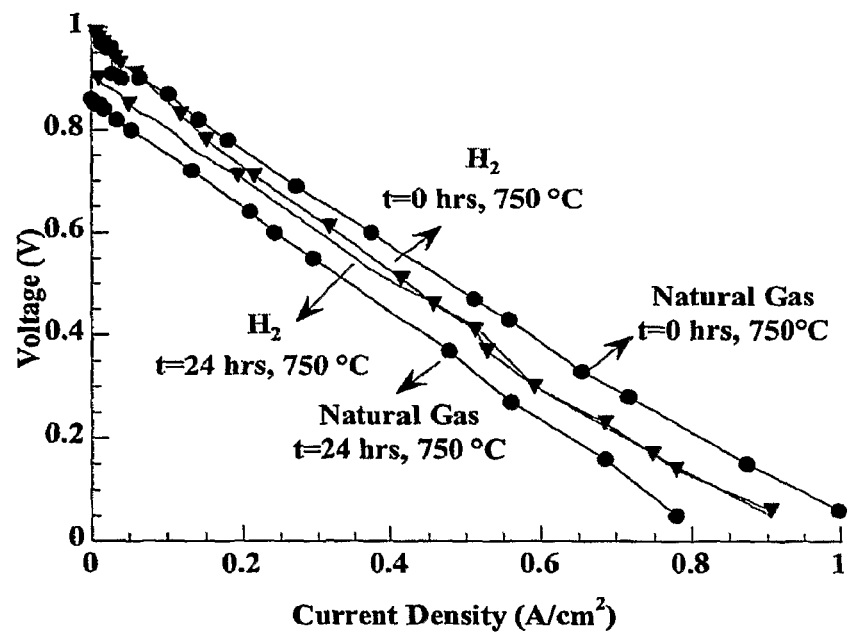
FIG. 21 is a graph detailing the performance of SOFC with Natural gas and $H_2$ as fuel.

FIG. 21 show the V-I curve of the fuel cell operated with $H_2$ and natural gas fuel. The initial level of current and voltage produced from both fuels are nearly identical except a small decay in electricity output with natural gas.

Preparation of a Cu/SDC/YSZ Anode

The process for preparing the anode is as follows: SOFC used for this embodiment consists of Cu/SDC as an anode, YSZ (Yttrium stabilized Zirconia) as an electrolyte, and LSM (lanthanum strontium manganite, $La_{0.8}Sr_{0.2}MnO_3$) as a cathode. The preparation of this fuel cell can be found in the paper (Lu, C; Worrell, W. L.; Gorte, R. J.; Vohs, J. M. SOFCs for direct oxidation of hydrocarbon fuels with samaria-doped ceria electrolyte. Journal of the Electrochemical Society (2003), 150(3), A354-A358.), hereby incorporated in its entirety.

Figure 22:
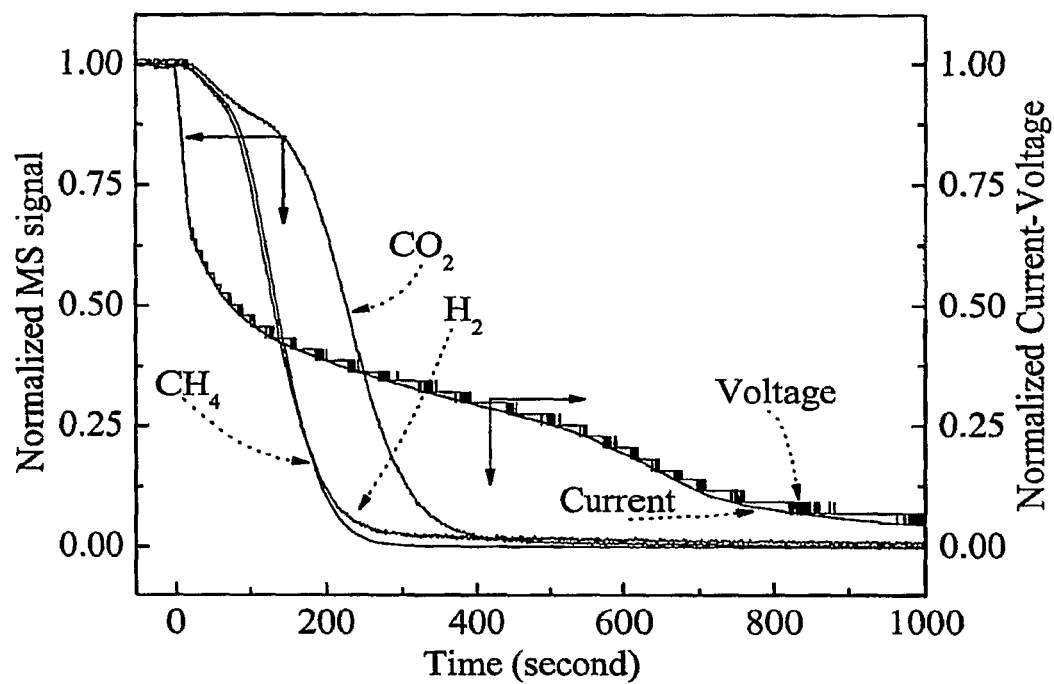
FIG. 22 is a graph of normalized MS and current-voltage responses to the step switch from $CH_4$ to Ar into the SOFC in close circuit.

FIG. 22 shows the results of the step switch of the inlet flow from $CH_4$ to Ar. The step switch resulted in a sudden termination of the $CH_4$ fuel which causes a rapid decrease in $CH_4$ concentration in the fuel cell effluent. Step switch also causes the drop in $H_2$ and $CO_2$ concentration profiles as well as decrease in current and voltage. The initial rapid decrease in current and voltage appears to relate to the decrease in $H_2$; the latter trailing of the current and voltage corresponds to gradual decrease in $CO_2$. The results suggest that electrochemical oxidation of methane involve with hydrogen and then carbon. The rate of electrochemical oxidation of hydrogen is higher than that of carbon.

Figure 23:
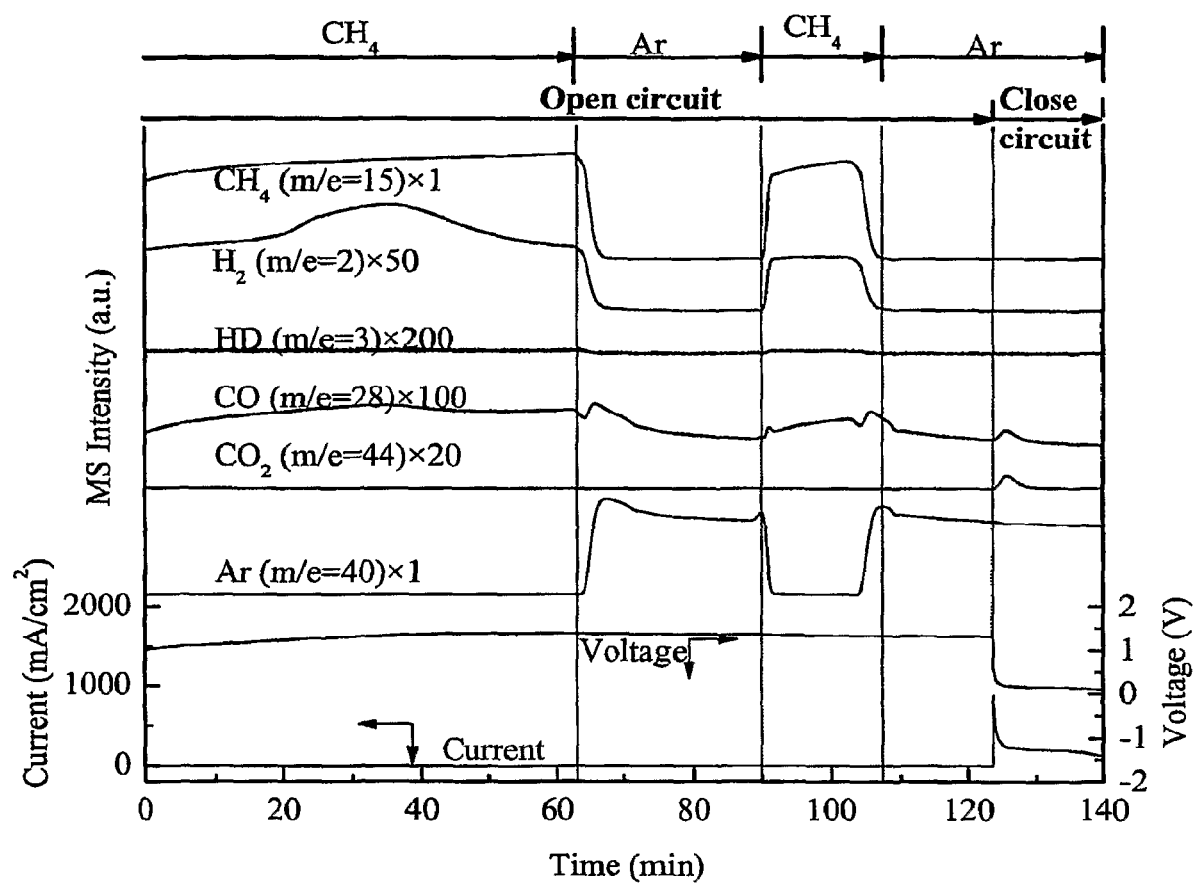
FIG. 23 is a graph of V-I and mass spec, responses to step changes in Ar and $CH_4$ flow.

FIG. 23 shows the fuel cell gave a stable open circuit voltage between 1.1 and 1.3 volts with $CH_4$. The open circuit voltage was kept at the same level while the $CH_4$ flow was switched to Ar flow, suggesting some form of solid fuel, which is very likely to be in the form of carbon species, on the anode catalyst surface. The possible effects of $CH_4$ on the $Cu/CeO_2$ anode are to reduce $CeO_2$ to $CeO_x$ and to deposit carbon species on the anode catalyst surface. The carbon species was electrochemically oxidized to $CO/CO_2$ and current/voltage outputs in close circuit, as shown in the response curves in the 120 to 140 min region in FIG. 23.

This embodiment shows that (i) electrochemical oxidation of $CH_4$ involves first C—H dissociation and hydrogen oxidation followed by carbon oxidation and (ii) carbon deposits on the Cu/SDC can be further electrochemical oxidized to $CO/CO_2$, giving voltage/current outputs. Thus, the anode catalyst which can catalyze electrochemical oxidation of $CH_4$ is also active for catalyzing oxidation of carbon in coal.

Preparation of a $Cu/CeO_2$ Based Anode

Cu is used due to its high electron conductivity and resistance to coking with $CeO_2$ being used/known as one of the best oxidation catalysts among oxides and resistance to hydrocarbon coking, the porous electrolyte YSZ, SDC (Sm-doped ceria) or GDC (Gd-doped Ceria), and/or oxygen anion conductor serve as the support for the anode catalysts. $Sm_2O_3$ can alternatively be used to stabilize the $CeO_2$ and improve its ion conductivity. YSZ behaves as a very stable electrolyte and is not electronically conductive.

Preparation of Ce-Zirconia Based Anode

The ceria-zirconia solid is prepared by using cerium nitrate $(Ce(NO_3)_3.6H_2O)$ and zirconium chloride octahydrate $(ZrOCl_2.8H_2O)$ as precursors and a cationic surfactant, cetyltrimethylammonium bromide $(CH_3(CH_2)_{15}N(CH_3)_3Br$, CTAB) as molecular template. The preparation procedure is as follows: (i) 7.57 g $Ce(NO_3)_3.6H_2O$, 5.62 g $ZrOCl_2.8H_2O$, and 15.27 g CTAB is dissolved together into 500 ml DI $H_2O$; (ii) 25 vol % $NH_4OH$ solution is prepared and stored in two vessels; (iii) The cerium/zirconium solution and 25 vol % $NH_4OH$ solution are dropped simultaneously into the other bottom 25 vol % $NH_4OH$ solution with intense agitation to disperse the droplets. During the dropping process, the pH of the bottom $NH_4OH$ solution is maintained at about 11 by adjusting the dropping rate; (iv) after aging for 24 hours, yellowish precipitate is filtered, dried at 80° C. for 3 days, and then calcined at 600° C. for 4 hours.

Figure 24:
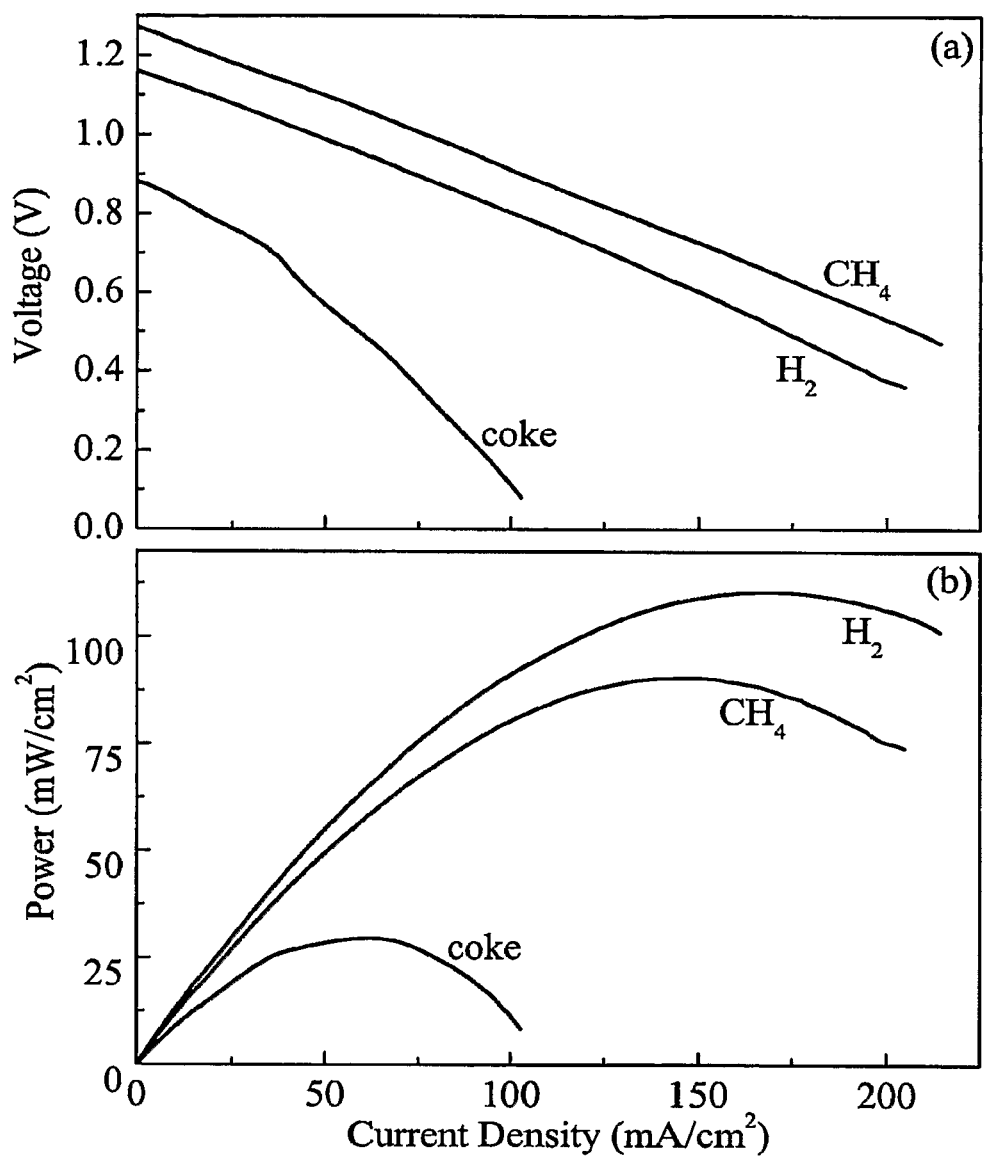
FIG. 24 details graphs of a fuel cell (a) voltage versus current density (I-V curve), and (b) power density versus current density (I-P curve) with $H_2$, $CH_4$, and coke as fuels separately over Cu/CeO$_2$ZrO$_2$/LSCF anode catalyst at 850° C.

Following preparation of $CeO_2$—$ZrO_2$, the $CeO_2$—$ZrO_2$ was mixed with LSCF to paste on the YSZ to form the anode. FIG. 24 details the Fuel cell (a) voltage versus current density (I-V curve), and (b) power density versus current density (I-P curve) with $H_2$, $CH_4$, and coke as fuels separately over $Cu/CeO_2ZrO_2/LSCF$ anode catalyst at 850° C.

Fabrication of LSCF (Lanthanum Strontium Cobalt Ferrite) Anode SOFC

Figure 25:
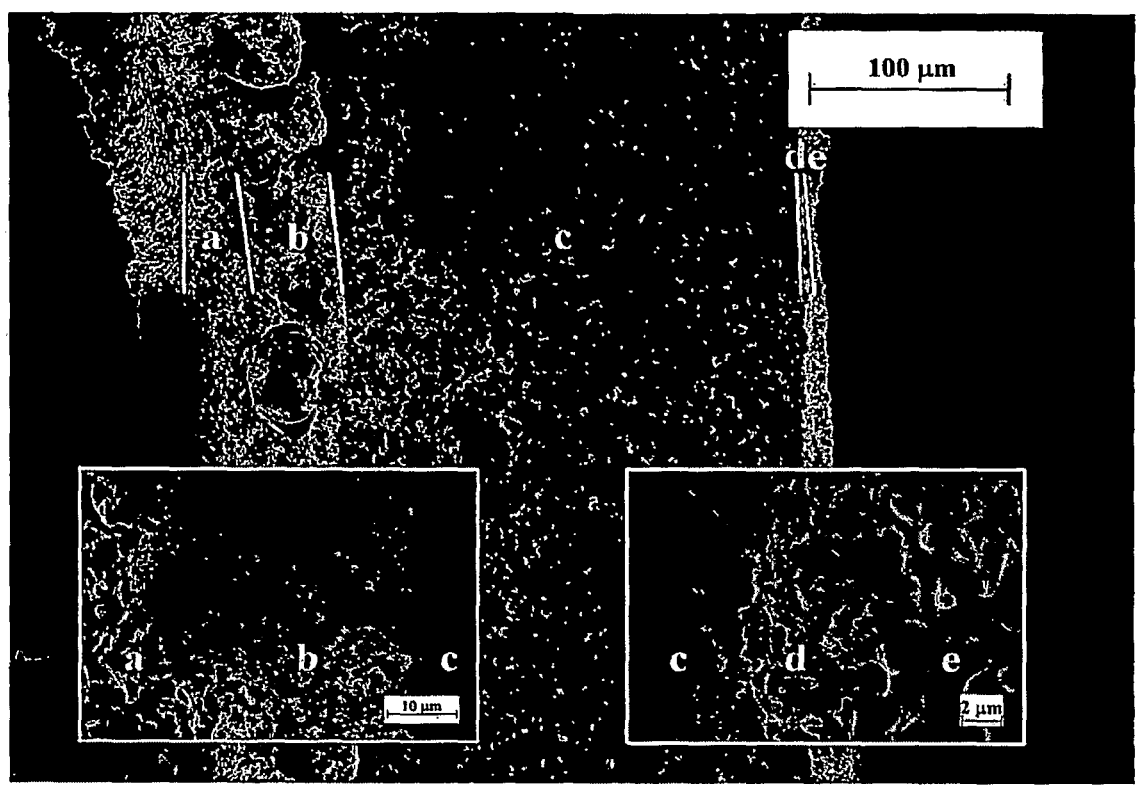
FIG. 25 SEM images of the SOFC—SEM showing the a) Platinum paste, b) LSCF/YSZ anode, c) YSZ electrolyte, d) LSM cathode, and e) Platinum paste.

FIG. 25 illustrates a scanning electron microscope (SEM) image of the SOFC. The fuel cell consists of a LSCF (NexTech Materials LSCF 6428 $((La_{0.6}Sr_{0.4})(Cu_{0.2}Fe_{0.8}))$ and YSZ (Tosoh, TZ-8Y) anode with a thickness of 100 μm, a co-axial pressed 200 μm thick YSZ electrolyte, and LSM based (NexTech Materials, LSM-20) cathode was used for this study.

The YSZ electrolyte layer was obtained by ballmilling YSZ powder in a 2-propanol solution with polyvinyl butyral (Butvar, PVB B-79) as a binder for 24 hours, followed by drying and screening through a 100 mesh sieve. The sieved YSZ powder was then die-pressed into a green YSZ disc at a pressure of 120 MPa and sintered at 1400° C.

The sintered YSZ disk then had a 50 μm layer LSM/YSZ cathode, in a 1:1 weight ratio, screen printed and fired at 1250° C. A second 50 μm cathode layer of pure LSM was then applied and fired at 1100° C. resulting in a 0.35 $cm^2$ active area. An equal area was screen printed and fired at 1100° C. on the opposite side of the cathode to form the 50% LSCF and 50% YSZ anode. The LSCF/YSZ anode was screen printed over a platinum grid that was connected to a platinum wire for current collection. The cathode current collections was achieved by covering LSM with platinum paste (Engelhard, A3788A), grid, and wire followed by firing at 900° C.

LSCF/YSZ paste for the anode layer was prepared by grinding a mixture of 50 wt. % LSCF and 50 wt. % YSZ then added to polyethylene glycol (Sigma, PEG Wt 550) at 80° C. and stirred for 30 minutes before allowing to cool to room temperature.

Figure 26:
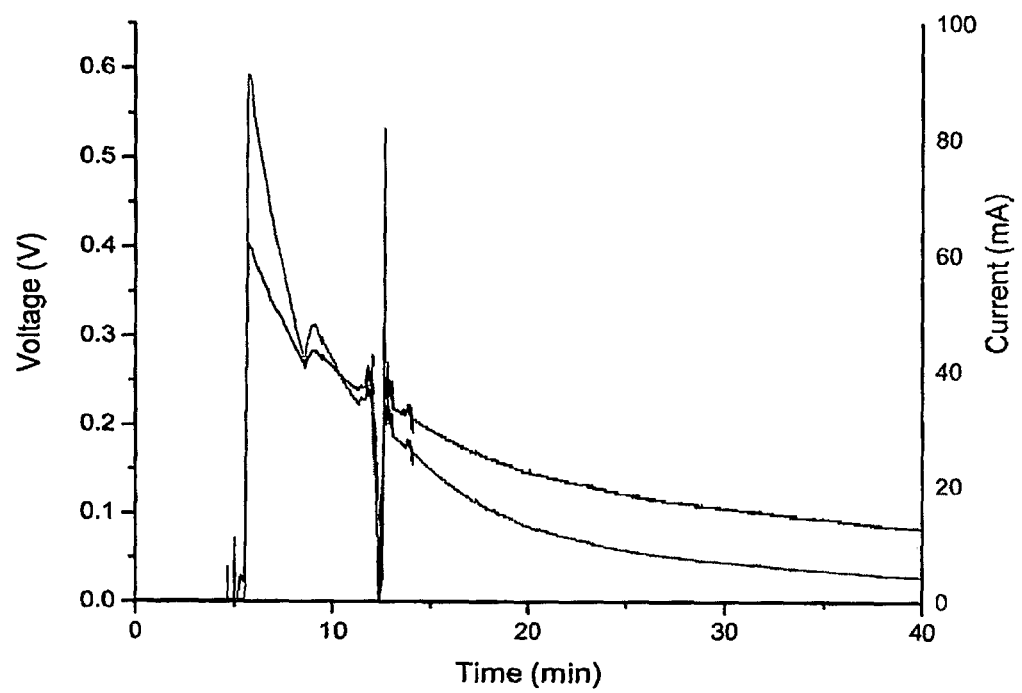
FIG. 26 is a graph detailing the fuel cell performance: Anode: LSCF, Fuel: 0.5 grams of Ohio #5 coal at 750° C.
Figure 27:
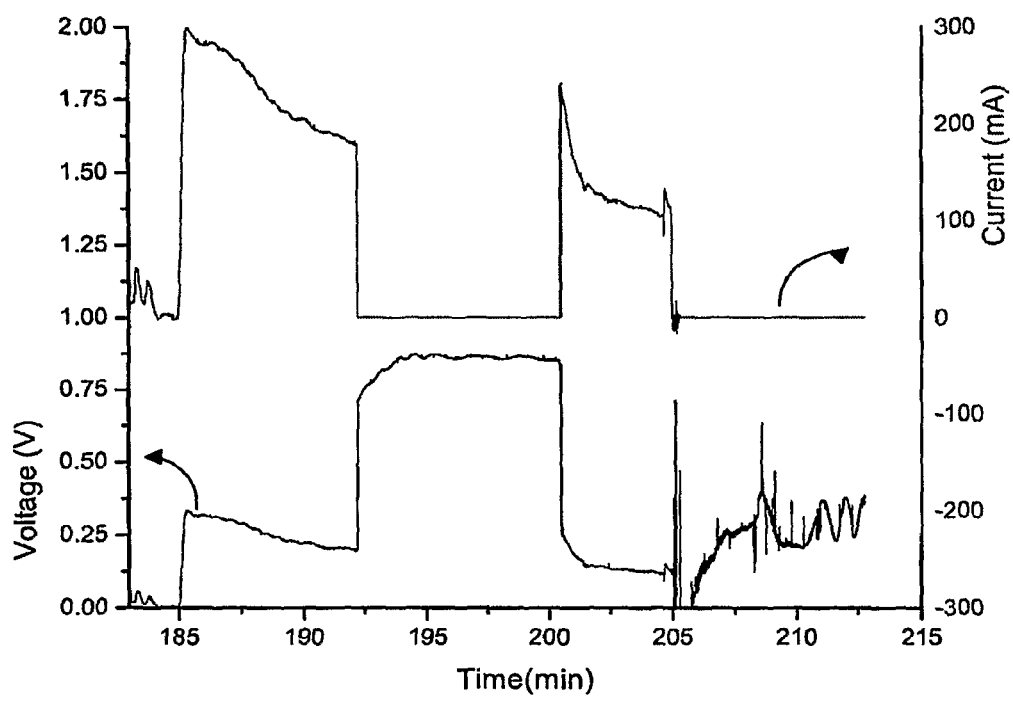
FIG. 27 is a graph detailing the fuel cell performance: Anode: oxide; Fuel: 3 grams of Ohio No. 5 coal at 800° C.

Coal particle is injected into the fuel cell which is attached to the testing unit. The solid. FIGS. 26 and 27 are the current—voltage output of a fuel cell with a LSCF anode at 750 and 800° C., respectively. The heavier line in the FIG. 26 represents the voltage output; the lighter line denotes the current output. The decrease in current and voltage as a function of time is a result of build up of fly ash. Injection of fresh coal and raising the fuel cell temperature to 800° C. increase the current-voltage output. The maximum current obtained was 300 mA/cm$^2$ at 0.34 V, indicating that the oxide catalysts hold a great promise.

Effects of Biomass as a Fuel

An application for use of carbonized charcoal powder as an electrode is provided in Carbonized charcoal electrode for electrochemical devices. Antal, Michael J., Jr. (University of Hawaii, USA). PCT Int. Appl. (2004), 20 pp.) CODEN: PIXXD2 WO 2004093222 A1 20041028 which is hereby incorporated in its entirety. Charcoal is provided as a powder, carbonized, and placed in a container by which compressive pressure is applied to the carbonized-charcoal powder via one or more sides of the container. As a result of the compressive pressure the packed-bed of carbonized-charcoal powder manifests a resistivity of less than about 1 Ωcm and is suitable for use as an electrode in a fuel cell, battery or electrolyzer. The application is adapted with electronic contacts to conduct electricity flow to or from the electrode and adapted for communication of an electrolyte with the electrode. This application details how biomass can be converted to a highly electric conductive charcoal. Highly electric conductive carbon containing material is an ideal fuel for the fuel cell of the present invention.

What is claimed is:

1. A direct electrochemical oxidation fuel cell system for generating energy from a solid state organic fuel comprising:
   a cathode provided with an electrochemical-reduction catalyst that promotes formation of oxygen ions from an oxygen-containing source at the cathode;
   an anode chamber;
   a solid-state anode within said anode chamber, the anode being provided with an electrochemical-oxidation catalyst, the anode being in contact with the solid state organic fuel such that the electrochemical-oxidation catalyst promotes direct electrochemical oxidation of the solid state organic fuel in the presence of the oxygen ions to produce electrical energy;
   the anode catalyst being Ce oxide, Ce—Zr oxide, Ce—Y oxide, Cu, Ag, Au, Ni, Mn, Mo, Cr, V, Fe, Co, Ru, Rh, Pd, Pt, Ir, Os, a perovskite or any combination thereof;
   a solid-oxide electrolyte disposed to transmit the oxygen ions from the cathode to the anode with the electrolyte in continuous contact with the anode and cathode and with direct electrochemical oxidation of the solid state organic fuel occurring at the anode;
   a means for feeding the solid state organic fuel to the anode chamber, the means for feeding including:
      an isolation chamber,
      an isolation chamber inlet valve positioned between a source of the solid state organic fuel and an inlet into said isolation chamber,
      an isolation chamber exit valve positioned between the isolation chamber and the anode chamber,
      an inlet purge valve separate and distinct from said isolation chamber inlet valve and communicating with said isolation chamber, and
      an outlet purge valve separate and distinct from said isolation chamber exit valve and communicating with said isolation chamber, wherein the means for feeding is adapted to feed the solid state organic fuel to the anode chamber without the presence of air by:
         (a) closing the isolation chamber exit valve and opening the isolation chamber inlet valve and advancing the solid state organic fuel to the anode chamber,
         (b) closing the isolation chamber inlet valve to isolate the solid state organic fuel in the isolation chamber,
         (c) opening the inlet purge valve and the outlet purge valve and purging the isolation chamber of air,
         (d) closing the inlet purge valve and the outlet purge valve,
         (e) opening the isolation chamber outlet valve and advancing the solid state organic fuel to the anode chamber;
   a means for removing waste;
   a means for securing the anode, electrolyte and cathode; and
   a means for drawing off electricity.

2. The fuel cell system of claim 1 wherein the perovskite is $(La_{1-x}Sr_x)_{0.9}Cr_{0.5}Mn_{0.5}O_{3-\delta}$, $Sr_2Mg_{1-x}Mn_xMoO_{6-\delta}$, $Ba_{1-x}Sr_xCo_{1-y}Fe_yO_{3-\delta}$, or $La_{1-x}A_xCo_{1-y}Fe_yO_{3-\delta}$ with:
   A being Sr, Ba, or Ca;
   X and Y being a value between 0.0 and 1.0; and
   $\delta$ being a value less than 1.0.

3. The fuel cell system of claim 1 wherein the cathode is $La_{1-x}Sr_xMnO_{3-\delta}$, $La_{1-x}Ca_xMnO_3$, $La_{1-x}Sr_xFeO_3$, $La_{1-x}Sr_xCoO_3$, $La_{1-x}Sr_xCo_{1-y}Ni_yO_{3-\delta}$, $La_{1-x}Sr_xCo_{1-y}Fe_yO_{3-\delta}$, $La_{1-x}Sr_xNi_{1-y}Fe_yO_{3-\delta}$, $SrFe_xCo_yO_{3-\delta}$, $Sm_{0.5}Sr_{0.5}CoO_3$, $La_2NiO_4$ or $YBa_2Cu_3O_{3-\delta}$ with:
   X and Y are between 0.0 and 1.0; and
   $\delta$ is less than 1.0.

4. The fuel cell system of claim 1 wherein the electrolyte is $(ZrO_2)_{0.92}(Y_2O_3)_{0.08}$, $(Bi_2O_7)_{0.75}(Y_2O_3)_{0.25}$, $(La_2O_3)_{0.95}(SrO)_{0.05}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}(Sc_2O_3)_{0.1}$, $(ZrO_2)_{0.9}(Y_2O_3)_{0.1}$, or $(ZrO_2)_{0.87}(CaO)_{0.13}$.

5. The fuel cell system of claim 1 wherein the electrolyte is yttrium-stabilized zirconia or scandium stabilized zirconia.

6. The fuel cell system of claim 1 wherein the solid-state organic fuel is coke, coal, graphite, biomass, polymeric materials or any combination thereof.

7. The fuel cell system of claim 1 which is capable of operating between 450° C. and 900° C.

8. The fuel cell system of claim 1 where the means for securing the anode, electrolyte and cathode is a ceramic adhesive and a metal tube, metal framework, metal structure or metal plate and includes a current collector.

9. The fuel cell system of claim 8 wherein the current collector and the metal tube, metal framework, metal structure or metal plate are made from Fe and Cr as major components and C, Mn, P, S, Si, N, Ti and Al as minor components.

10. The fuel cell system of claim 1 further comprising:
   an inlet port for providing gas to the cathode; and
   an exit port for the removal of waste and/or byproducts.

11. The fuel cell system of claim 1 where the anode is Ni electroless plated with Cu, Au and/or Ag.

12. A fuel cell system comprising a stack of fuel cells as defined in claim 1.

* * * * *